US007457793B2

(12) United States Patent
Weigt et al.

(10) Patent No.: US 7,457,793 B2
(45) Date of Patent: Nov. 25, 2008

(54) INVESTIGATING EXECUTION OF A CUSTOMIZED TRANSACTION PROCESS IN A COMPUTER APPLICATION

(75) Inventors: Matthias Weigt, Oestringen (DE); Gregor Kempers, Essen (DE); Marco Rodeck, Maikammer (DE)

(73) Assignee: SAP AG, Walldorf (DE)

( * ) Notice: Subject to any disclaimer, the term of this patent is extended or adjusted under 35 U.S.C. 154(b) by 4 days.

(21) Appl. No.: 11/244,275

(22) Filed: Oct. 6, 2005

(65) Prior Publication Data

US 2006/0112059 A1 May 25, 2006

Related U.S. Application Data

(60) Provisional application No. 60/618,184, filed on Oct. 14, 2004.

(51) Int. Cl.
*G06N 5/00* (2006.01)
(52) U.S. Cl. .......................................... 706/47; 706/45
(58) Field of Classification Search ................. 705/37, 705/64, 76; 706/47, 45; 717/126, 131, 133
See application file for complete search history.

(56) References Cited

U.S. PATENT DOCUMENTS

| 4,714,995 | A |   | 12/1987 | Materna et al. |
|---|---|---|---|---|
| 5,187,788 | A |   | 2/1993 | Marmelstein |
| 5,295,222 | A |   | 3/1994 | Wadhwa et al. |
| 5,634,127 | A |   | 5/1997 | Cloud et al. |
| 5,721,912 | A |   | 2/1998 | Stepczyk et al. |
| 5,778,373 | A |   | 7/1998 | Levy et al. |
| 5,802,371 | A | * | 9/1998 | Meier .......................... 717/133 |
| 5,812,850 | A | * | 9/1998 | Wimble ....................... 717/131 |
| 5,819,093 | A | * | 10/1998 | Davidson et al. ............ 717/126 |
| 5,870,605 | A |   | 2/1999 | Bracho et al. |

(Continued)

FOREIGN PATENT DOCUMENTS

EP            0 592 045            4/1994

(Continued)

OTHER PUBLICATIONS

Gray, et al.; "The Dangers of Replication and a Solution"; Sigmod '96, Montreal, Canada; pp. 173-182; (Jun. 1996).

(Continued)

*Primary Examiner*—Wilbert L Starks, Jr.
(74) *Attorney, Agent, or Firm*—Fish & Richardson P.C.

(57) ABSTRACT

Techniques enable a user, such as a business analyst or a system administrator, to define business process rules that control the processing of transaction data by a computer application. A data structure is used to store business process rules. The data structure includes a condition portion and an execution portion of a rule. At runtime, the computer system executing a computer application determines whether a condition portion of a rule is met, and in response to a determination that the condition portion is met, performs an execution portion of the rule. When an execution portion of the rule is performed, the computer system generates and stores a protocol entry in a rule protocol data structure that corresponds to the rule. A protocol entry in the rule protocol data structure may custom attributes. The protocol entries in the rule protocol data structure that relate to a particular data object may be displayed.

15 Claims, 12 Drawing Sheets

U.S. PATENT DOCUMENTS

| | | | |
|---|---|---|---|
| 5,870,765 | A | 2/1999 | Bauer et al. |
| 5,873,096 | A | 2/1999 | Lim et al. |
| 5,889,863 | A * | 3/1999 | Weber .................. 705/76 |
| 5,943,424 | A * | 8/1999 | Berger et al. ............ 705/64 |
| 5,978,779 | A * | 11/1999 | Stein et al. ............ 705/37 |
| 6,052,684 | A | 4/2000 | Du |
| 6,256,676 | B1 | 7/2001 | Taylor et al. |
| 6,446,092 | B1 | 9/2002 | Sutter |
| 6,775,658 | B1 | 8/2004 | Zothner |
| 2002/0095653 | A1 | 7/2002 | Parr et al. |
| 2002/0107752 | A1 | 8/2002 | Rivera et al. |

FOREIGN PATENT DOCUMENTS

| | | |
|---|---|---|
| EP | 1 217 515 | 6/2002 |
| WO | WO 93/04436 | 3/1993 |
| WO | WO 00/79408 | 12/2000 |
| WO | WO 01/27806 | 4/2001 |
| WO | WO 02/091240 | 11/2002 |

OTHER PUBLICATIONS

Huston, et al.; "Disconnected Operations for AFS"; USENIX Association, Mobile and Location-Independent Computing Symposium; pp. 1-10; (Feb. 1993).

Urban, et al.; "Interconnection of Distributed Components: An Overview of Current Middleware Solutions"; Journal of Computing and Information Science in Engineering, vol. 1; pp. 23-31; (Mar. 2001).

Herbst, et al.; "A Repository System for Business Rules"; *Proceedings of the 6th IFIP TC-2 Working Conference on Data Semantics*; R. Meersman L. Mark (Eds.); London: Chapman & Hall; pp. 1-18 (1995).

Wan-Kadir, et al.; "Relating Evolving Business Rules to Software Design"; *Journal of Systems Architecture*; Amsterdam, NL: Elsevier Science Publishers; pp. 367-382; (Jul. 2004).

Kardasis, et al.; "Expressing and Organising Business Rules"; *Information and Software Technology*; Amsterdam, NL: Elsevier; pp. 701-718; (Mar. 2, 2004).

Extended European Search Report dated Jun. 20, 2006 for European Application No. EP 05 022 511.9 (10 pages).

* cited by examiner

INVESTIGATING EXECUTION OF A CUSTOMIZED TRANSACTION PROCESS IN A COMPUTER APPLICATION

CROSS REFERENCE TO RELATED APPLICATIONS

This application claims the benefit of U.S. Provisional Application No. 60/618,184, filed Oct. 14, 2004 and titled CUSTOMIZING TRANSACTION PROCESSING IN A COMPUTER APPLICATION, which is incorporated by reference in its entirety.

TECHNICAL FIELD

This description relates to techniques for customizing transaction processing performed by computer systems.

BACKGROUND

Enterprise information technology (IT) systems often are used to manage and process business data. To do so, a business enterprise may use various application programs running on one or more enterprise IT systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. In many cases, application programs used by a business enterprise are developed by a commercial software developer for sale to, and use by, many business enterprises.

An application program may be customized to meet the specific requirements of the environment in which the application program is operating. For example, an application program running on a computer system may be customized to meet the specific requirements of a group of users, such as a particular business enterprise or a particular department in a company. Examples of such customization include customization of the data model, the process model, or the user interface of the application. Customization of an application program may require knowledge of the data model, the process model, and/or the user interface of the application program. Customization of an application program also may require knowledge of programming techniques used to develop the application program.

One approach to customizing an application program is by modifying the computer programs of the application program. Another approach is to develop a second application program that performs a customized process and integrate the second application program with the original application program, for example, by exchanging data between the second, custom-developed application program and the original application program.

SUMMARY

Generally, the described techniques enable a user, such as a business analyst or a system administrator, to define business process rules that control the processing of transaction data by a computer application and to assign a collection of business process rules to one of multiple predefined points in a business process of a computer application. At runtime, when the computer system executing the computer application reaches a point in a business process that is associated with a collection of user-defined business process rules, the computer system executes the business process rules. In this manner, a customized process represented by user-defined business process rules is able to be added to a computer application.

In one general aspect, techniques are provided for defining a custom computer-executed business process for a particular business enterprise. A generic component includes instructions that, when executed, cause transaction data to be processed in a manner that is applicable to many different business enterprises. A rule handling component includes data structures and instructions that, when executed, enable a person to define information that controls the manner of processing transaction data that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The rule handling component enables a person to identify information for storage in entries in i) the rule collection data structure, ii) the rule data structure, and iii) the rule condition data structure. The rule handling component also enables a person to associate at least one entry in the rule collection data structure with an execution point in a transaction process identified in the generic component.

Implementations may include one or more of the following features. For example, data structures in the rule handling component may include a collection link data structure to store collection link data. A collection link entry in the collection link data structure may include an association between a rule entry in the rule data structure and a rule collection entry in the rule collection data structure. The rule handling component may enable a person to associate the rule entry in the rule data structure with the rule collection entry in the rule collection data structure.

The data structures in the rule handling component may include a rule link data structure to store rule link data. A rule link entry in the rule link data structure may include an association between a rule entry in the rule data structure and a rule condition entry in the rule condition data structure. The rule handling component may enable a person to associate the rule entry in the rule data structure with the rule condition entry in the rule condition data structure.

The data structures in the rule handling component may include a rule sub-condition data structure to store rule sub-condition data. A rule sub-condition entry in the rule sub-condition data structure may include a sub-condition portion. The sub-condition portion may define a sub-condition that is associable with a rule condition for which the execution portion of a related rule entry is to be executed. At least one entry in the rule sub-condition data structure may relate to at least one entry in the rule condition data structure. The rule handling component may enable a person to identify information for storage in entries in the rule sub-condition data structure.

The data structures in the rule handling component may include a rule condition link data structure to store rule condition link data. A rule condition link entry in the rule condition link data structure may include an association between a rule condition entry in the rule condition data structure and a rule sub-condition entry in the rule sub-condition data structure. The rule handling component may enable the person to associate the rule condition entry in the rule condition data structure with the rule sub-condition entry in the rule sub-condition data structure.

The data structures in the rule handling component may include an application execution point data structure to store application execution point data. An entry in the application execution point data structure may identify an execution point in a transaction process identified in the generic component. The data structures also include an external execution point data structure to store external execution point data. At least one entry in the external execution point data structure may relate to at least one entry in the rule collection data structure and may relate to at least one entry in the application execution point data structure. The rule handling component may enable a person to associate at least one entry in the rule collection data structure with at least one entry in the external execution point data structure.

The rule handling component may enable a person to associate at least one entry in the external execution point data structure with at least one entry in the application execution point data structure.

The data structures in the rule handling component may include an external link data structure to store external execution point link data. The entry in the external link data structure may include an association between an entry in the external execution point data structure and a rule collection entry in the rule collection data structure.

The data structures in the rule handling component may include an application link data structure to store application execution point link data. An entry in the application link data structure may include an association between an entry in the external execution point data structure and an entry in the application link data structure. A second generic component may cause transaction data applicable to the second generic component to be processed in a manner that is applicable to many different business enterprises. The rule handling component may enable a person to associate at least one entry in the rule collection data structure with an execution point in a transaction process identified in the second generic component.

In another general aspect, techniques are provided for another aspect of defining a custom computer-executed business process for a particular business enterprise. A generic component includes generic data attributes and causes generic transaction data to be processed in a manner that is applicable to many different business enterprises. A rule handling component includes data structures and causes transaction data to be processed in a manner that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The rule handling component determines whether a condition portion of a rule condition entry in the rule condition data structure is met, and in response to a determination that the condition portion is met, perform an execution portion of a rule entry in the rule data structure that is related to the rule condition entry.

Implementations may include one or more of the features noted above and one or more of the following features. For example, a custom component may include custom attributes that are not included in the generic data attributes. At least one entry in the rule structure may include an execution portion that references one or more of the custom attributes. At least one entry in the rule condition structure may include a condition portion that references one or more of the custom attributes.

In another general aspect, techniques are provided for another aspect of defining a custom computer-executed business process for a particular business enterprise. A generic component includes generic data attributes and causes generic transaction data to be processed in a manner that is applicable to many different business enterprises. A rule handling component includes data structures and causes transaction data to be processed in a manner that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The rule handling component enables a person to identify one of multiple pre-defined functions to be included in an execution portion of a rule entry in the rule data structure or to be included in a condition portion of a rule condition entry in the rule condition data structure.

Implementations may include one or more of the features noted above and one or more of the following features. For example, one of the pre-defined functions may be a function to access a type of data. Accessing the type of data may involve accessing at least two data elements that are stored in a different data structures. Another of the pre-defined function may be a function to store data elements in different data structures.

In yet another general aspect, techniques are provided for another aspect of customizing a computer-executed business process for a particular business enterprise. A generic component includes generic data attributes and causes generic transaction data to be processed in a manner that is applicable to many different business enterprises. A rule handling component includes data structures and causes transaction data to be processed in a manner that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The rule handling component enables a person to indicate one or more search attributes. The rule handling component searches in the entries of one or more of i) the rule collection data structure, ii) the rule data structure, and iii) the rule condition data structure to identify one or more entries that match the one or more search attributes. The rule handling component displays the identified one or more entries that match the one or more search attributes.

Implementations may include one or more of the features noted above and one or more of the following features. For example, the data structures may include a rule sub-condition data structure to store rule sub-condition data. A rule sub-condition entry in the rule sub-condition data structure may include a sub-condition portion. The sub-condition portion may define a sub-condition that is associable with a rule condition for which the execution portion of a related rule entry is to be executed. At least one entry in the rule sub-condition data structure may relate to at least one entry in the rule condition data structure. The rule handling component may search in the entries of the rule sub-condition data structure to identify one or more entries that match the one or more search attributes.

In yet another general aspect, techniques are provided for another aspect of customizing a computer-executed business process for a particular business enterprise. A generic component includes generic data attributes and causes generic transaction data to be processed in a manner that is applicable to many different business enterprises. A rule handling component includes data structures and causes transaction data to be processed in a manner that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The data structures also include an application execution point data structure to store application execution point data. An entry in the application execution point data structure identifies an execution point in a transaction process identified in the generic component. The data structures also include an external execution point data structure to store external execution point data. At least one entry in the external execution point data structure relates to at least one entry in the rule collection data structure, and relates to at least one entry in the application execution point data structure. When an indication is received that an application execution point is reached in a transaction process identified in the generic component, the rule handling component determines whether an entry in the external execution point data structure relates to the reached application execution point. In response to a determination that an entry in the external execution point data structure relates to the reached application execution point, the rule handling component determines whether an entry in the rule collection data structure is related to the entry in the external execution point data structure. The rule handling component, in response to a determination that an entry in the rule collection data structure is related to the entry in the external execution point data structure, takes several steps including i) identifying a rule entry in the rule data structure that is related to the entry in the rule collection data structure, ii) identifying a rule condition entry in the rule condition data structure that is related to the rule entry in the rule data structure, iii) determining whether a condition portion of a rule condition entry in the rule condition data structure is met, and iv) in response to a determination that the condition portion is met, performing an execution portion of a rule entry in the rule data structure that is related to the rule condition entry.

Implementations may include one or more of the features noted above and one or more of the following features. For example, the data structures may include a rule sub-condition data structure to store rule sub-condition data. A rule sub-condition entry in the rule sub-condition data structure may include a sub-condition portion that defines a sub-condition that is associable with a rule condition for which the execution portion of a related rule entry is to be executed. At least one entry in the rule sub-condition data structure relates to at least one entry in the rule condition data structure. The rule handling component may determine whether a sub-condition portion of a rule sub-condition entry in the rule sub-condition data structure is met, and only in response to a determination that the sub-condition portion is met, perform an execution portion of a rule entry in the rule data structure that is related to the rule condition entry.

In another general aspect, techniques are provided for another aspect of defining a custom computer-executed business process for a particular business enterprise. A generic component includes generic data attributes and causes generic transaction data to be processed in a manner that is applicable to many different business enterprises. A rule handling component includes data structures and causes transaction data to be processed in a manner that is applicable to a particular business enterprise. The data structures in the rule handling component include a rule collection data structure to store rule collection data, a rule data structure to store rule data, and a rule condition data structure to store rule condition data. A rule entry in the rule data structure includes an execution portion that identifies processing of transaction data to be performed when a rule condition associated with the rule entry is met. At least one entry in the rule data structure relates to at least one entry in the rule collection data structure. A rule condition entry in the rule condition data structure includes a condition portion that defines conditions for which the execution portion of a related rule entry is to be executed. At least one entry in the rule condition data structure relates to at least one entry in the rule data structure. The rule handling component determines whether a condition portion of a rule condition entry in the rule condition data structure is met. In response to a determination that the condition portion is met, the rule handling component performs an execution portion of a rule entry in the rule data structure that is related to the rule condition entry. The rule handling component generates and stores a protocol entry in the rule protocol data structure that corresponds to the rule condition entry.

Implementations may include one or more of the features noted above and one or more of the following features. For example, a custom component may include custom attributes that are not included in the generic data attributes. A protocol entry in the rule protocol data structure may include one or more custom attributes. The rule handling component may display one or more protocol entries in the rule protocol data structure that relate to a particular data object. A protocol entry may include an indication whether a sub-condition portion associated with the entry in the rule sub-condition data structure was met, and an execution status indicating results when the sub-condition portion was met.

The techniques for enabling a user to define business process rules that are later executed at a predefined point in a previously defined process of a computer application are useful. For example, a user, such as a business analyst or system administrator rather than a computer programmer, may be able to define and revise business process rules for a computer application. This may be particularly useful in a business context in which a large number of business process rules (perhaps, hundreds or even thousands of rules) are used by a business entity where the business process rules used are not supported by the original computer application. The techniques also may be particularly useful to make modifications to a business process performed by a complex computer application, such as an enterprise application sold or licensed by a commercial software developer. In such a case, a user may not be able to access the computer program or programs of the commercial software. Even when a user may be able to do so, however, the user may not know, or be able to readily discern, which technical feature of the computer application (such as a particular object attribute or a particular user interface) should be modified to add a desired customized process to the computer application. This may be particularly true when a business process (such as placing an order, fulfilling a sales order, or managing a customer return of a purchased item) of the computer application includes a large number of user interfaces (such as screens, panes or windows) and complex data objects that are stored across multiple data structures (such as database tables).

Implementations of any the techniques discussed above may include a method or process, a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
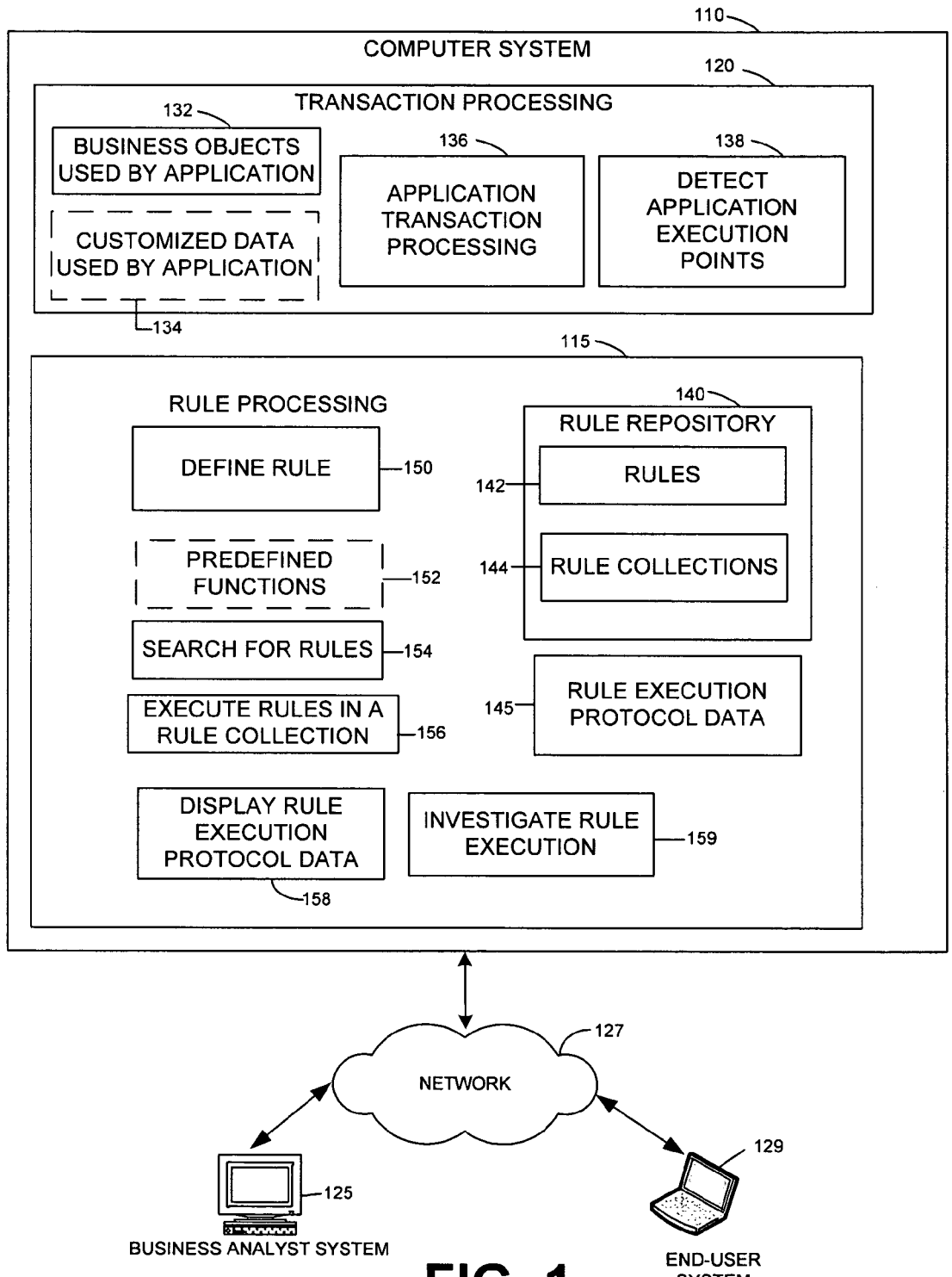
FIG. 1 is a block diagram of a system incorporating various aspects of the invention.

FIG. 1 shows a block diagram of a system 100 of networked computers, including a computer system 110 having a rule processing component 115 that is able to apply user-defined business process rules to transaction data created and revised in a transaction processing component 120. In general, a user, such as a business analyst or a system administrator who need not necessarily be a computer programmer, uses a computer system 125 to access the computer system 110 over a network 127 to create and revise business process rules used to control processing of transaction data and to assign a collection of the user-defined business process rules to one of multiple predefined points in a business process performed by the transaction processing component 120. A user uses a computer system 129 to create and revise transaction data that is processed by the transaction processing component 120 according to the user-defined business process rules.

More particularly, the system 100 includes the computer systems 110, 125 and 129, all of which are capable of executing instructions on data and all of which are interconnected via the network 127. Examples of the network 127 include the Internet, wide area networks (WANs), local area networks (LANs), or any other wired or wireless network. The business analyst system 125 and the end-user system 129 each may be a general-purpose computer that is capable of operating as a client of the application program (such as a desktop personal computer, a workstation, or a laptop computer running an application program), or a more special-purpose computer (such as a device specifically programmed to operate as a client of a particular application program). For brevity, FIG. 1 illustrates only a single business analyst system 125 and a single end-user system 129 for system 100. However, actual implementations may include multiple business analyst and end-user computer systems.

The computer system 110 may be a general-purpose computer or a special-purpose computer. The computer system 110 includes a rule process component 115 and a transaction process component 120. A particular portion of data, here referred to as business objects 132, are stored on the computer system 110 and includes multiple business objects. Each business object in business objects 132 is a collection of data attribute values, and typically is associated with a principal entity represented in a computing device or a computing system. Examples of a business object include information about a customer, an employee, a product, a business partner, a product, a sales invoice, and a sales order. Business objects associated with a principal entity may be referred to as master data. Some implementations make a distinction between a master data object that refers to a principal entity and a transaction object that refers to a master data object. For example, a sales order object may be a transaction object that refers to a customer object, a type of master data object. A business object may be stored as a row in a relational database table, an object instance in an object-oriented database, data in an extensible mark-up language (XML) file, or a record in a data file. Attributes are associated with a business object. In one example, a customer business object may be associated with a series of attributes including a customer number uniquely identifying the customer, a first name, a last name, an electronic mail address, a mailing address, a daytime telephone number, an evening telephone number, date of first purchase by the customer, and date of the most recent purchase by the customer. In another example, a sales order business object may include a customer number of the purchaser, the date on which the sales order was placed, and a list of products, services, or both products and services purchased. In yet another example, a return request business object may include a customer number of the purchaser, an item number of the purchased item that the customer wishes to return, date on which the request was received, and an indication whether the return request was approved.

The transaction processing component 120 of the computer system 110 may be a computer application. In one example, the transaction processing component 120 may be a commercial computer application that is developed and licensed (or sold) by a commercial software developer that is different from the business entity that uses the system 100. In another example, the transaction processing component 120 and the rule processing component 115 are part of a suite of commercial computer applications that are developed and licensed (or sold) by a commercial software developer for use by multiple, different business entities. The business entity that uses the system 100 may be referred to as a customer of the commercial software developer. In such a case, the transaction processing component 120 also may include customized data 134 that includes attributes and attribute values that are defined by the customer. The customized data 134 also may be referred to as custom data or customer data. In one example, a commercial software developer may include a database table (or other type of data structure) that is associated with a particular type of master data. A computer programmer may add customized data to the computer application by adding attributes to the database table. The database table may be referred to as a customizing database table. The computer application displays, and enables an end-user to modify, values of the attributes in the database table when master data objects with which the database table are associated are displayed and modified.

A business object is processed by instructions 136 for application transaction processing. The instructions 136 define one or more business processes that are performed by the computer application. The instructions 136 may include the computer programs used by the transaction processing component 120 to perform the computer application. The transaction processing component 120 also includes instructions 138 for detecting execution points that are defined for a business process performed by the application transaction processing 136, as described more fully later.

The rule processing component 115 of the computer system 110 includes a rule repository 140 for storing business process rules 142 created and revised by users. A business process rule includes a condition portion and an execution portion. The condition portion identifies the conditions under which actions identified by the execution portion are performed.

In one implementation, the rule execution portion identifies a computer program that is initiated when the condition is met. Rules 142 in the rule repository 140 are created and revised by users using a process 150 to define rules that is described more fully below.

A business process rule may represent, or help to represent, an operating procedure or policy of a business. One example of a business process rule is that checks, verifies or validates data (such as verifying that a day that occurs in the month of January is between 1 and 31). Another example of a business process rule is a collection of business process rules that are conditionally executed to control a complex or multiple step process that influences data. For example, a multiple-step return process may involve two return locations in which the first location does a rough inspection only checking x and a second location performs a subsequent inspection including checking y and creating a new data entry, record or document stored in the transaction processing component 120. In another example, a rule may determine whether a value of return request is sufficient to allow the return. An item may only be returned if the value of the item, or the cumulative value of the items, meets or exceeds a particular threshold value. In another example, a rule may determine whether a value of a return request is sufficient to allow the return that is based on the geographic location from which the return is sent. For example, a rule may reflect that in a particular geographic region (for example, from Sweden) there is a particular return value threshold, whereas there may be another return value threshold for returns made from another geographic region (for example, from Germany).

In some implementations, a rule condition of a rule may be a complex condition that includes a reference to a condition of another rule. For example, a rule condition may include a condition that references another rule and a new condition. In another example, a rule condition may include references to multiple other rules. When multiple rules are combined in a rule condition, the rules in the complex condition may be joined by an "and" operator that requires all of the rules referenced in the rule condition to be true or may be joined by an "or" operator that requires only one of the multiple rules to be true to trigger the performance of the actions identified by the execution portion of the rule. The ability of a rule condition to reference another rule enables a user to define a rule (or part of a rule) once and use the rule multiple times. This may be particularly useful when rules are complex. For example, customized processes may treat certain types of customers differently than other types of customers. Preferential treatment may be provided, for example, to a valuable or loyal customer. Such a customer (who may be referred to as a trustworthy customer) may be extended credit when other customers are not extended credit, or a trustworthy customer may be provided with a different amount of credit than a customer who is not deemed to be trustworthy customer. A trustworthy customer may be permitted to return items that other customers are not allowed to return. In such a case, a rule that defines a trustworthy customer may be used in a variety of customized processes or multiple times in a particular customized process. In one example of a rule that defines a trustworthy customer, a rule may check a customer type indicator in a customer record. In another example, a rule to determine whether a customer is trustworthy may include a complex process that requires the execution of a data mining analysis or a business warehouse process over historical transaction data to determine whether the customer is trustworthy.

In another example, a customized process may execute different steps for selling a dangerous item or allowing a dangerous item to be returned. Whether an item is dangerous may be defined in a rule condition that is used in multiple processes or multiple times in a single process. In one example, an item may be dangerous because of a property of the item—for example, the item is explosive. In another example, an item may be dangerous only relative to a particular geographic region to which, or from which, the item is being shipped. For example, particular types fireworks are legal in some geographic areas of the United States and are not legal in other areas. Thus, it may be useful to use a rule that defines whether an item is dangerous in multiple customized processes or multiple times in a customized process.

In one example implementation of how a rule condition may reference another rule condition, a rule condition may be defined based on rule sub-conditions that are linked by Boolean operators, such as "and" and "or." A condition portion of a rule may be stored in one or more data structures that are separate from the rule data structure that stores the execution portion of the rule. Storing conditions and sub-conditions that may be used to make up a condition of a rule separately from the execution portion of the rule may be useful when a large number of rules are used. For example, a rule condition or a rule sub-condition may be defined once and used by multiple rules. When the rule condition or rule sub-condition is revised, the rule condition (or rule sub-condition) need only be changed once. This may help reduce the human effort required to create and revise rules, particularly in a context where there are a large number of rules or where rule conditions frequently change. A rule sub-condition also may be referred to as a partial rule.

In some implementations, a rule may include customized data 134. Thus, a customized process may be defined that uses customized data 134. In one example, a rule may allow a return to be approved only when the item to be returned is under warranty. A warranty indication for an item may be included as a customized attribute in a customizing database table. The warranty indicator may be used in a rule condition. In another example, to determine whether the part is under warranty, an external warranty system may need to be queried by the rule to determine whether the part serial number is listed in the warranty system as being under warranty.

The rule repository also includes collections 144 of business process rules. A collection of business process rules also may be referred to as a rule profile. A rule collection is associated with one of multiple user-accessible execution points in a process defined by the transaction component 120. In some implementations, a user is able to access only some (but not all) of the execution points defined in a process of a commercial software program. In other words, in some implementations, an execution point to which the collection of rules is assigned is an external execution point that is mapped to one of multiple internal business process execution points that are not otherwise accessible to the user.

A rule collection in collections 144 also is associated with an object type that controls the use of the rules in the collection. An object type may be used as a proxy of a process type that defines the type of data needed for a process. For example, a sales order requires a ship-to address, a return request requires a ship-from address, and a sales opportunity requires neither a ship-to address or a ship-from address. An object type, for example, may be a sales offer or opportunity, an activity, a return request, or a sales order. Thus, the object type assigned identifies processing to be performed—such as processing performed for a sales offer, or processing performed for a sales order.

In some implementations, a rule collection may be associated with multiple object types. This may be particularly useful in an computer application that includes a process for different types of data. Such a combination or mixed process, for example, may define the data and steps to be performed for processing a document that includes information about two sales opportunities and a sales order that defines the data and steps.

The rule processing component 115 also includes data 145 related to execution of a business processing rule for a particular business object. The data 145 may be referred to as rule execution protocol data. The rule execution protocol data 145 enables a user to monitor the results of rule execution and, when necessarily, to correct the result of misappropriate application of a business process rule by enabling a user to selectively deactivate a rule as to a particular business object.

In one implementation, the rule execution protocol is a data structure that includes one line for each rule in a rule collection that is executed for a business object. Each entry in that implementation of rule execution protocol data 145 includes an execution point at which the rule executed, a condition used to trigger the execution of the rule, name or other type of identifier for the object for which the rule was executed, whether the rule successfully executed, and comments inserted during the execution of the rule. A comment may be inserted during execution of the rule based on a comment that is defined in the execution portion of the rule to be inserted in the rule execution protocol data under particular conditions.

In some implementations, customized data used by a rule may be included in the rule execution protocol data. For example, customized data may include 1) attributes that are not included in the original computer application developed by a commercial software developer or 2) attributes that are added for a particular group of users in a proprietary computer application. The customized data included in the rule execution protocol data may be used by the condition portion of the rule, the execution portion of the rule, and/or both the condition and execution portions of the rule. The rule execution protocol data is able to be displayed by instructions 159 for rules that are executed to support user investigation, such as an inquiry as to why a rule failed with regard to a particular business object. In sum, a user may be able to extend the rule execution protocol by adding customized data to the rule execution protocol. Then, when the rule execution protocol entry is displayed, the customized data values also are displayed and available to help the user determine investigate how the rule was processed as to a particular business object.

In one example, the rule execution protocol defines the data structure for rules processed by rule processing component 115. The data structure includes a portion that is reserved for customer-defined data. A user, such as a business analyst or a system administrator defining a rule, uses a predefined function to identify data from external systems or customized data, such as customized data 134, to be included in the customer-defined data portion of the rule execution protocol. After the customer-defined data is identified, a rule or rules may be defined that include the customer-defined data as part of a rule condition or as part of a rule execution method.

Turning now to a discussion of the executable instructions 150-159 included in the rule processing component 115, instructions 150 for defining a business process rule are included in the rule processing component 115. An example of instructions 150 includes code segments for displaying and controlling a user interface that enables a user to create and/or revise a business process rule, as described more fully later. In one implementation, the instructions 150 display a user interface that enables a user to define a rule having a condition portion and an execution portion that is executed when the condition is fulfilled, to bundle or associate one or more rules into a rule collection, and to assign the rule collection to an execution point, which is detectable by the transaction processing component when transaction data are processed.

In some implementations, the user interface of the define rule process 150 also allows a user to use one or more predefined functions 152 in a rule. An example of a predefined function in functions 152 is a method operable on a type of a business object. Typically, a predefined function enables a business object to be accessed or a attribute value associated with the business object to be set. The ability to use predefined functions 152 in a rule may be particularly useful when a computer application uses a complex data model, such as when a business object is stored across multiple database tables or structures. These functions generally relates to data access and store capabilities. Examples of predefined functions include a function for accessing data for a currently selected product, a function for accessing access data for a currently selected business partner, a function for accessing access data for a currently selected order item, or a function for accessing particular data fields (such as order date) in a particular business object type. In another example, a function may set a particular data field, such as set the order date to the current date.

A function in functions 152 may be identified by the user defining a business process rule as an action to be performed as part of the execution portion of the business process rule or, in some implementations, as an aspect of the condition portion of the business process rule condition to be performed. When a data model is complex, the ability of use a predefined function may be particularly useful to hide data model complexity. In some implementations, a user may be restricted from accessing or operating on data in the data model except as permitted by a predefined function.

In some implementations, the user interface of the define rule process 150 also allows a user to search 154 for rules. More particularly, a user may identify a search criteria for a business process rule that may include any business object attribute used to define a rule condition or execution process to be performed when a rule condition is met. In some implementations, the search process identifies related business process rules and presents the business process rules in context, as described more fully later. The ability for a user to search for a rule that may be useful particularly when a rule condition (and/or sub-condition) may be used in more than one rule. This may be particularly true when a complex data structure is used to store rule execution portions, rule conditions, and rule sub-conditions in separate data structures, as described more fully later.

The rule processing component 115 also includes instructions 156 for executing rules in a rule collection. In general, when the transaction component 120 detects a particular execution point in a process, the rule processing component applies rules in a rule collection that is associated with the detected execution point on the business object being processed by the transaction component 120.

The rule processing component 115 also includes instructions 158 for displaying an entry of the rule execution profile data 145 that indicates how a business process rule was applied to a particular business object. In some implementations, the instructions 158 are operable to enable a user to deactivate a rule as to the particular business object—that is, a user is able to stop a particular business process rule from being applied to a particular business object while permitting the business process rule to be enforced or otherwise applied to other business objects.

By allowing a user to deactivate a particular rule selectively, stronger rules may be defined and applied than may be advisable if a user did not have the capability to selectively deactivate a particular rule. For example, to help ensure that only correct data is automatically processed by the rules, more restrictive rules may be used with the expectation that some of the automatically processed rejections are to be investigated by a user (and likely to be overridden by the user) to ensure that a transaction is not improperly processed. For example, in a context where a very large number of orders are processed (such as 6,000 orders per hour), it may be desirable to use more restrictive rules that are more likely to reject a permitted transaction than to approve an impermissible transactions and have a user verify all, or a portion, of the rejected transaction and to selectively disable the application of an overly strict rule in the context of a particular rejection to allow the formerly rejected data to be processed, while permitting the rule to be enforced as to all other data.

The rule processing component 115 also includes instructions 159 for investigating rule execution. An example of instructions 159 includes code segments for displaying and controlling a user interface that enables a user, such as a business analyst, to display information related to using business process rules to process a particular business object. In a context of a large number of customer-defined business processing rules, the user needs to be able to see the results of processing to support manual investigation of rejections from an automated rule processing process.

In one example, a rule exists that a customer must return an item within four weeks of purchase. However, a particularly valuable customer misses the deadline by one day and so the return object is rejected by the automatic rule processing engine. A user with the manual investigator role is routed the rejection for analysis. After viewing the rule protocol, the user determines that the rule was missed by a small amount and by an important customer, so the user deactivates the rule that caused the return to be rejected so that the return can be processed. The rule remains in force as to all other transactions, including other returns of the same customer.

When the transaction processing component executes a process, the transaction processing component monitors application transaction processing for a business object to detect an execution point for which a rule collection is associated. When an external execution point is detected, the business process rules associated with the rule collection are processed with respect to the business object. Instructions 159 for executing the rules associated with a rule collection are included. As the business process rule is executed, the rule processing component creates an entry in the rule execution profile data 145. In some implementations, the rule execution portion may be operable to set a status indicating that processing of the business object requires manual investigation.

After rule processing is complete, a user is permitted to display the rule execution protocol data related to the rule and/or the rules in the rule collection executed for the business object. In some implementations, the user is permitted to display customer-specific data, which may help the user understand the results of rule execution. A user also may be permitted to selectively deactivate a rule with respect to only the business object processed.

Providing a rule processing component that allows a user to identify and add business process rules to a complex computer application enables a business enterprise operating the computer application to control the rule modifications and reduces the complexity of adding rules to a complex computer application. This, in turn, helps to reduce the cost of customizing the computer application and reduce the total cost of ownership of the computer application. In addition, the techniques enables a business enterprise to appropriately and more accurately customize the computer application so that the computer application more accurately reflects the business entity's preferred business process.

Moreover, in some contexts, a business enterprise may have may one or more staff members who are responsible for revising business process rules in a computer application on a frequent basis (such as daily or weekly) because of the volatility, quantity and/or complexity of business process rules used by the business enterprise. This may be particularly true when a computer application is used by a business enterprise that provides highly customized services to customers, such as may occur in the construction vehicle market or automobile market. In such a context, a business enterprise may use different rules for different customers and have complex business processes, which may require a large number of business process rules to be created and revised on an ongoing basis. In such a context, it may be very difficult implement the required business process rules by developing customized computer programs.

As illustrated, the rule processing component 115 and the transaction processing component 120 are logically decoupled and reside on the same computer system 110, though this need not necessarily be so. In some implementations, the rule processing component 115 and the transaction processing component 120 may reside on different computer systems and be physically decoupled from each other. Similarly, only some aspects of rule processing component 115, such as the rule repository 140, may be physically decoupled from the transaction processing component 120. In some implementations, aspects of the rule processing component 115 may be more closely integrated with the transaction processing component 120.

In some implementations, the system 100 may be an enterprise IT system that includes multiple transaction processing components, each of which may be separate computer applications. The rule processing component 115 may be used to create and apply rules to more than one transaction processing component.

In one example, one transaction processing component may be a computer application for maintaining customer records, and another transaction processing component may be a computer application for creating sales orders placed by a customer. A call center agent may be able to access both of the sales order computer application and the maintain customer records computer application when responding to customer calls. This enables the call center agent to both place a sales order and update a customer's record (such as by changing the customer's address) when responding to a particular customer call. In such a case, it may be useful to define a collection of rules that use the updated customer record information in the sales order when the call center agent has changed the customer's address after placing the sales order. For example, a collection of rules may be associated with a processing execution point in the sales order computer application to check customer data for the sales order. One rule in the rule collection may result in replacing the original customer data in the sales order with the newly entered customer address data (when the rule condition that the customer address has changed is met). Thus, the system 100 may be used to define a customized process that is applied to multiple computer applications.

In some implementations, a commercial software developer may provide commercial software for use by many different business enterprises that includes one or more transaction processing components (each of which also may be referred to as a generic component) and a rule processing component (that also may be referred to as a rule handling component). A particular business enterprise may install the commercial software on one or more computer systems and use the rule processing component to define and revise as necessary rules to control the execution of a custom business process that is not supported by the commercial software as provided by the commercial software developer. In this manner, a business enterprise may customize transaction processing in a computer application.

Figure 2A:
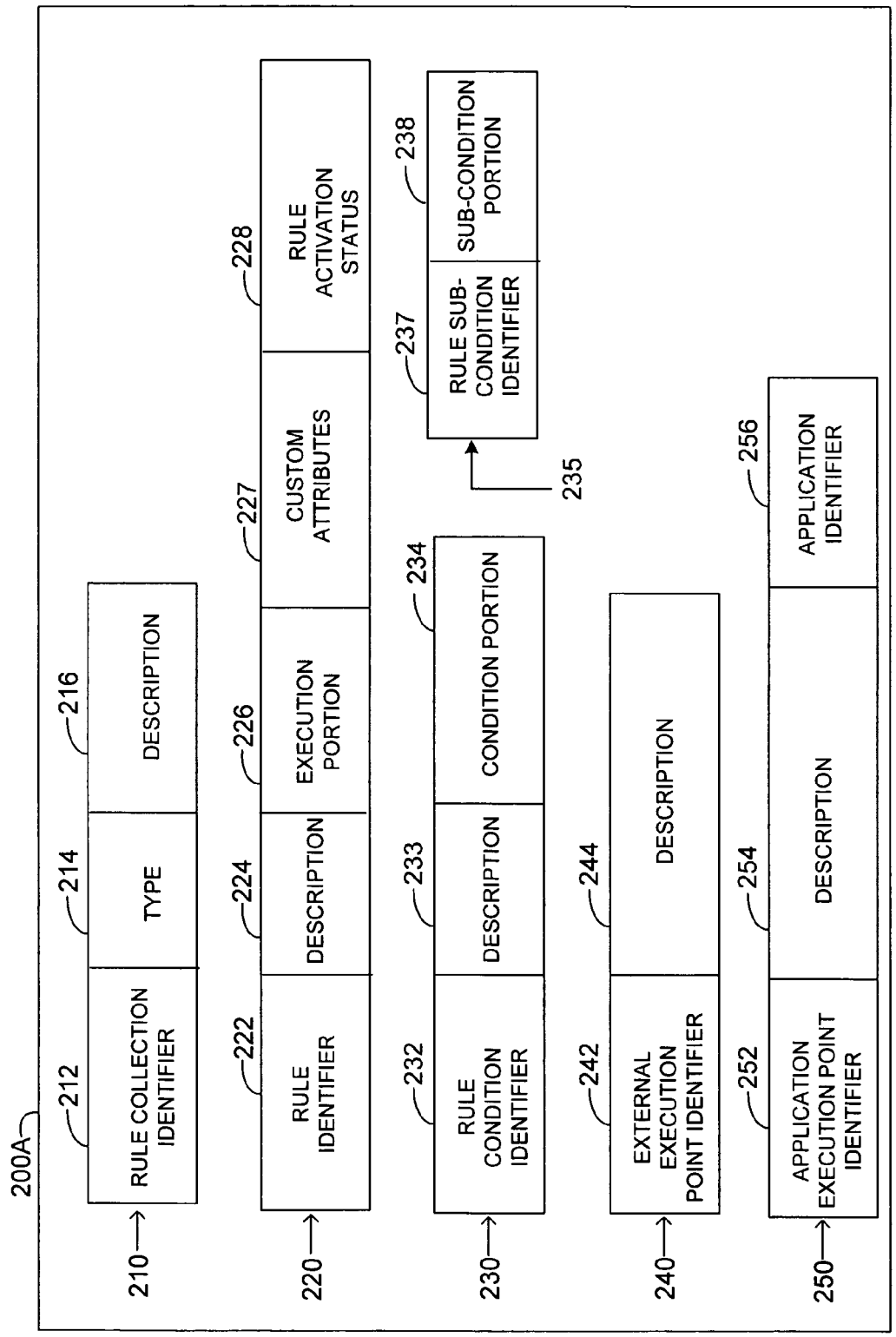
FIGS. 2A-2C are block diagrams illustrating example data structures for use in defining a business process rule and using the business process rule to process transaction data.
Figure 2B:
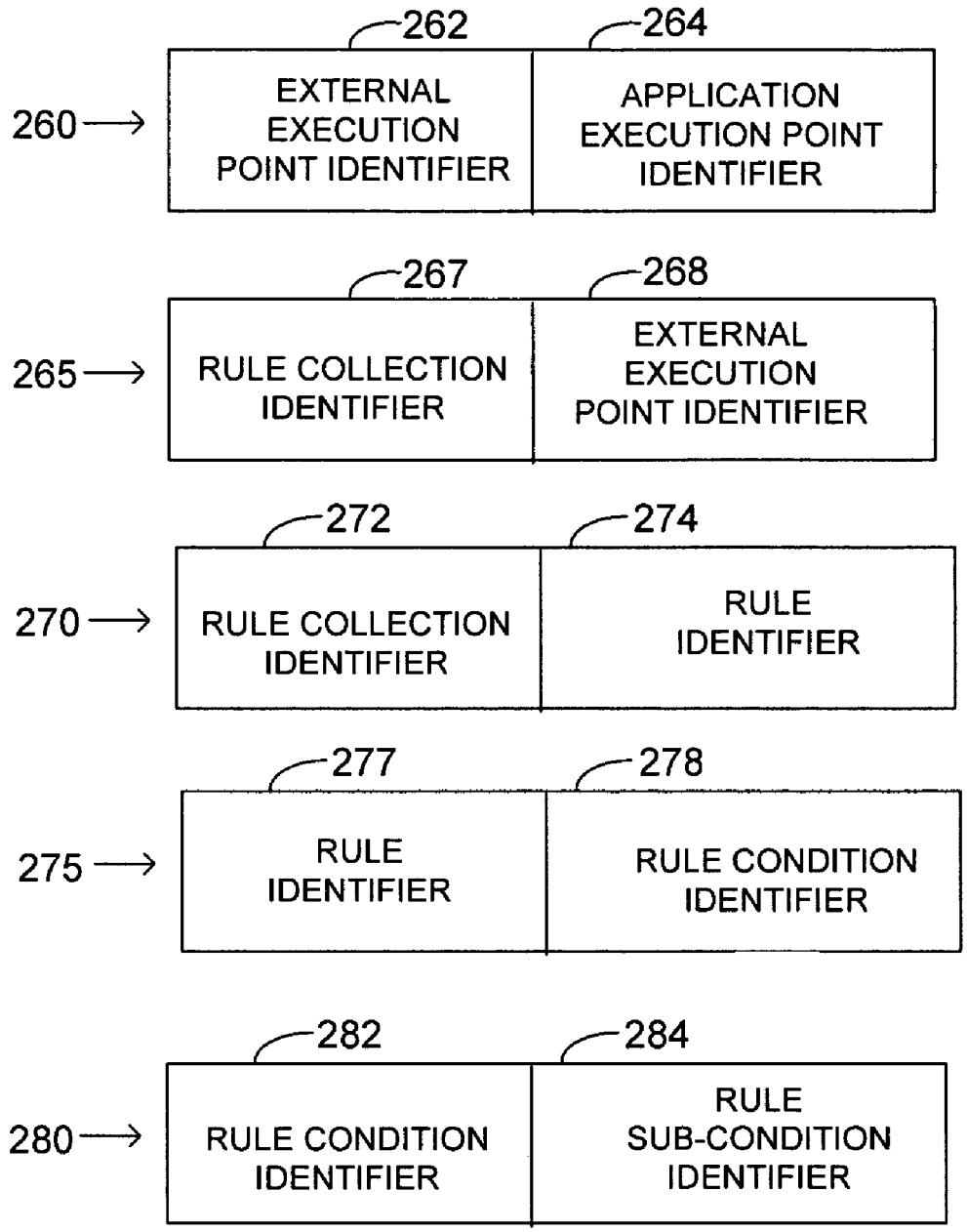
Figure 2C:
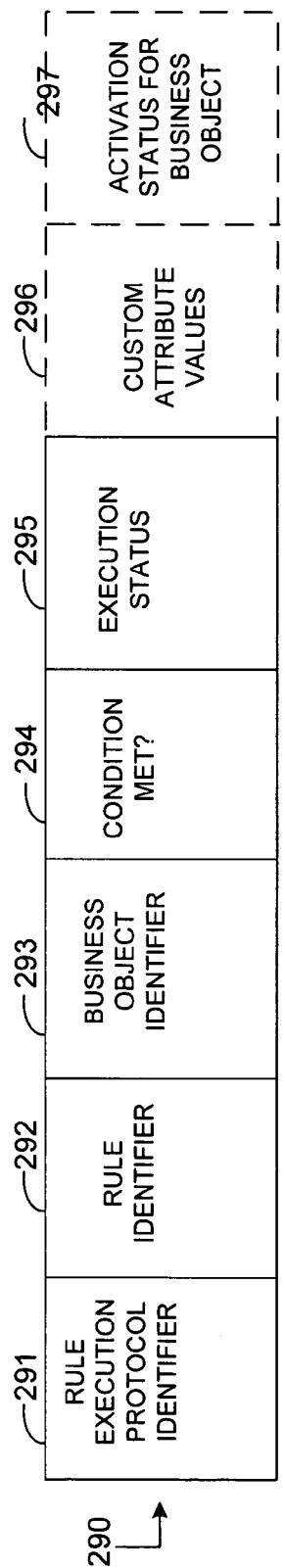

Before discussing the additional detail regarding the method by which business process rules are created and used, an example format that may be used for business process rules, and collections thereof, is first described. FIGS. 2A-2C show example data structures 200A-200C for information related to business process rules in simplified form. Referring to FIG. 2A, in general, each entry in the data structure 200A is able to store information about a rule collection object 210, information about a rule object 220, information about a rule condition object 230, information about an external execution point 240, and information about an application execution point 250. An application execution point also may be referred to as an internal execution point. The object entries in the data structure 200A are related, or linked, through link entries in the data structure 200B, as described more fully later.

The data structure 200A includes information 210 about a collection of business process rules. Each entry in the rule collection information 210 includes an rule collection identifier 212 to uniquely identify an particular collection of business process rules. The rule collection information 210 also includes a type 214 that identifies a type of process to which the particular collection of business process rules applies. In some implementations, the type 214 may indirectly identify a type of process. For example, a type 214 may identify a type of business object and, in so doing, indirectly identify a process that operates on the type of business object. In some implementations, the type 214 also may identify the rule collection identifier as a rule collection object type. The rule collection information 210 optionally may include a description 216 or a name, which may be helpful to describe the business purpose or objective for the rules in the rule collection.

The data structure 220 represents a rule and includes a rule identifier 222 that uniquely identifies a particular business process rule added by a user. The rule information 220 also includes a description 224 or a name that may be helpful to describe the business purpose or objective for the rule. The rule information 230 also may include an execution portion 226 for the rule identified by the rule identifier 222. In one example, a computer program or executable function may be identified by the execution portion 226. In some implementations, the execution portion 226 may identify one or more predefined functions, such as a function of predefined functions 152 of FIG. 1.

In some implementations, rule information 220 may identify one or more custom data attributes 227 to identify the types of data values (such as, attributes, database columns, or data fields) to be displayed when information about execution of the rule is displayed. For example, custom data attributes 227 may identify attributes in transaction data (e.g., a type of business object) that may be displayed, attributes in master data (e.g., a customer record) and/or custom data attributes that have been added to the transaction application.

In some implementations, rule information 220 may include an indication 228 concerning rule activation status—that is, whether or not the rule is activated. The status indicator 228 controls whether the rule is executed for all of the business objects that are processed for the rule collection that includes the rule.

The data structure 220A includes information 230 that represents a rule condition that may be related to one or more rules. The rule condition information 230 includes a rule condition identifier 232 that uniquely identifies a particular rule condition and a description 233 or a name that helps to identify the rule condition. The rule condition information 230 also includes a rule condition portion 233 that identifies rule sub-conditions (which also may be referred to as partial rules) that are linked by Boolean operators "and" and "or" in the rule condition portion 233.

The data structure 220A includes information 235 that represents a rule sub-condition that may be related to one or more rule conditions. The rule sub-condition information 235 includes a rule sub-condition identifier 237 that uniquely identifies a particular rule sub-condition and a rule sub-condition portion 238 that identifies a particular rule sub-condition. In some implementations, the rule sub-condition information also may include a description or a name to help identify the rule sub-condition.

In some implementations, the data structure 200A may include a condition portion of the rule in rule information 220 in addition to, or in lieu of, using entries for rule condition information 230 and rule sub-condition information 237. Similarly, in some implementations, rule condition information 230 may include the sub-condition portions in addition to, or in lieu of, being linked to sub-condition portions in rule sub-condition information 237.

The data structure 200A also includes external execution point information 240 that includes an external execution point identifier 242 that uniquely identifies a particular external execution point to which a user may associate one or more rule collections. The external execution point information 240 also includes a description 244 or a name that may be helpful to describe external execution point.

The data structure 200A also includes application execution point information 250 that includes an application execution point identifier 252 that uniquely identifies a particular application execution point to which one or more external execution points may be associated. The application execution point information 250 also includes a description 254 or a name that may be helpful to describe external execution point. The application execution point information 250 also may include an application identifier 256 that identifies a particular application to which the application execution point relates. This may be useful when the rule processing component is used for more than one computer application. An application execution point also may be referred to as an internal execution point.

Referring also to FIG. 2B, each link entry in data structure 200B is able to store information identifying two object entries in the data structure 200A. More particularly, the link information 260 is able to store an identifier 262 for an external execution point and an identifier 264 for an application execution point to identify a particular external execution point that is associated with a particular application execution point. An example of an external execution point identifier 262 is the external execution point identifier 242 of external execution point information 240 of FIG. 200A, and an example of an application execution point identifier is the application execution point identifier 252 of application execution point information 250 of FIG. 200A. Through the link information 260, one or more external execution points, such as one or more entries in the execution point information 240, can be associated with one or more application execution points, such as one or more entries in the application execution point information 250.

More particularly, each entry in link information 260 is able to associate an entry in the external execution point information 240 with an entry in the application execution point information 250. By using multiple entries of link information 260, multiple external execution points are able to be associated with the same application execution point and/or multiple application execution points are able to be associated with the same external execution point.

Generally, this is true for all of the link information 260-280. Some implementations may programmatically or otherwise restrict the association of some or all of the information 210-250 in FIG. 2A. For example, in some implementations, an external execution point may be permitted to be associated (or otherwise assigned) to only one application execution point in each application.

Similarly, link information 265 is able to store an identifier 267 for a rule collection and an identifier 268 for an external execution point. An example of an rule collection identifier 267 is the rule collection identifier 212 of rule collection information 210 of FIG. 200A. Through the link information 265, one or more rule collections, such as one or more entries in the rule collection information 210, can be associated with one or more external execution points, such as one or more entries in the execution point information 240.

Link information 270 is able to store an identifier 272 for a rule collection and an identifier 274 for a rule. An example of an rule identifier 274 is the rule identifier 222 of rule information 220 of FIG. 200A. Through the link information 270, one or more rule collections, such as one or more entries in the rule collection information 210, can be associated with one or more rules, such as one or more entries in the rule information 220. Thus, a particular rule can be used in multiple rule collections, and a rule collection can include multiple rules.

Link information 275 is able to store an identifier 277 for a rule and an identifier 278 for a rule condition. An example of an rule condition identifier 278 is the rule condition identifier 232 of rule information 230 of FIG. 200A. Through the link information 275, one or more rules, such as one or more entries in the rule information 220, can be associated with one or more rule conditions, such as one or more entries in the rule condition information 230. Thus, a particular rule condition can be used in multiple rules, and a rule can include multiple rule conditions.

Link information 280 is able to store an identifier 282 for a rule condition and an identifier 284 for a rule sub-condition. An example of an rule sub-condition identifier 284 is the rule sub-condition identifier 237 of rule sub-condition information 235 of FIG. 200A. Through the link information 280, one or more rule conditions such as one or more entries in the rule condition information 230, can be associated with one or more rule sub-conditions, such as one or more entries in the rule sub-condition information 235. Thus, a particular rule sub-condition can be used in multiple rule conditions, and a rule condition can include multiple rule sub-conditions.

The level of granularity provided in the data structures 200A and 200B of FIGS. 2A and 2B may help to reduce the amount of human effort required to create and revise business process rules to control a custom process. For example, a rule sub-condition need only be created once and may be used in multiple rule conditions, each of which may be used in multiple rules. In turn, each rule may be used in multiple rule collections. Similarly, the level of granularity may help a user use a search process to more easily identify a rule or a portion of a rule (a condition or a sub-condition) when a large number of rules are stored by the data structures 200A and 200B.

Referring now to FIG. 2C, a data structure 200C is able to store rule execution protocol information 290 that describes the execution of a rule (that is identified by rule identifier 291) on a particular business object (that is identified by business object identifier 292). As described previously, at runtime, an entry in rule execution protocol information 290 may be created for each rule in a rule collection that is processed for a particular business object at runtime. In some implementations, an entry in rule execution protocol information is created for each rule condition that is processed at runtime. Similarly, some implementations may create an entry in rule execution protocol information for each rule sub-condition that is processed at runtime. Some implementations may only create an entry in the rule execution protocol for rules, rule conditions or rule sub-conditions that are met at runtime.

The rule execution protocol information 290 includes an identifier 291 for the rule execution protocol entry and an indication 294 whether all of the condition portions associated with the rule was met (e.g., satisfied) and an execution status 295 that identifies one of multiple statuses associated with the executed rule. For example, an execution status for a customize return process may include approved (indicating that the return is approved), rejected (indicating that the return is not permitted or authorized), or manual investigation (indicating that the automated rule processing was unable to determine whether the status is to be approved or rejected).

The rule execution protocol information 290 optionally also may include custom attribute values (e.g., data values of custom attributes, fields or database columns that are identified by custom attributes 227 of the executed rule) and an activation status 297 with regard to the particular business object processed (e.g., the business object identified by the business object identifier 293).

Figure 3:
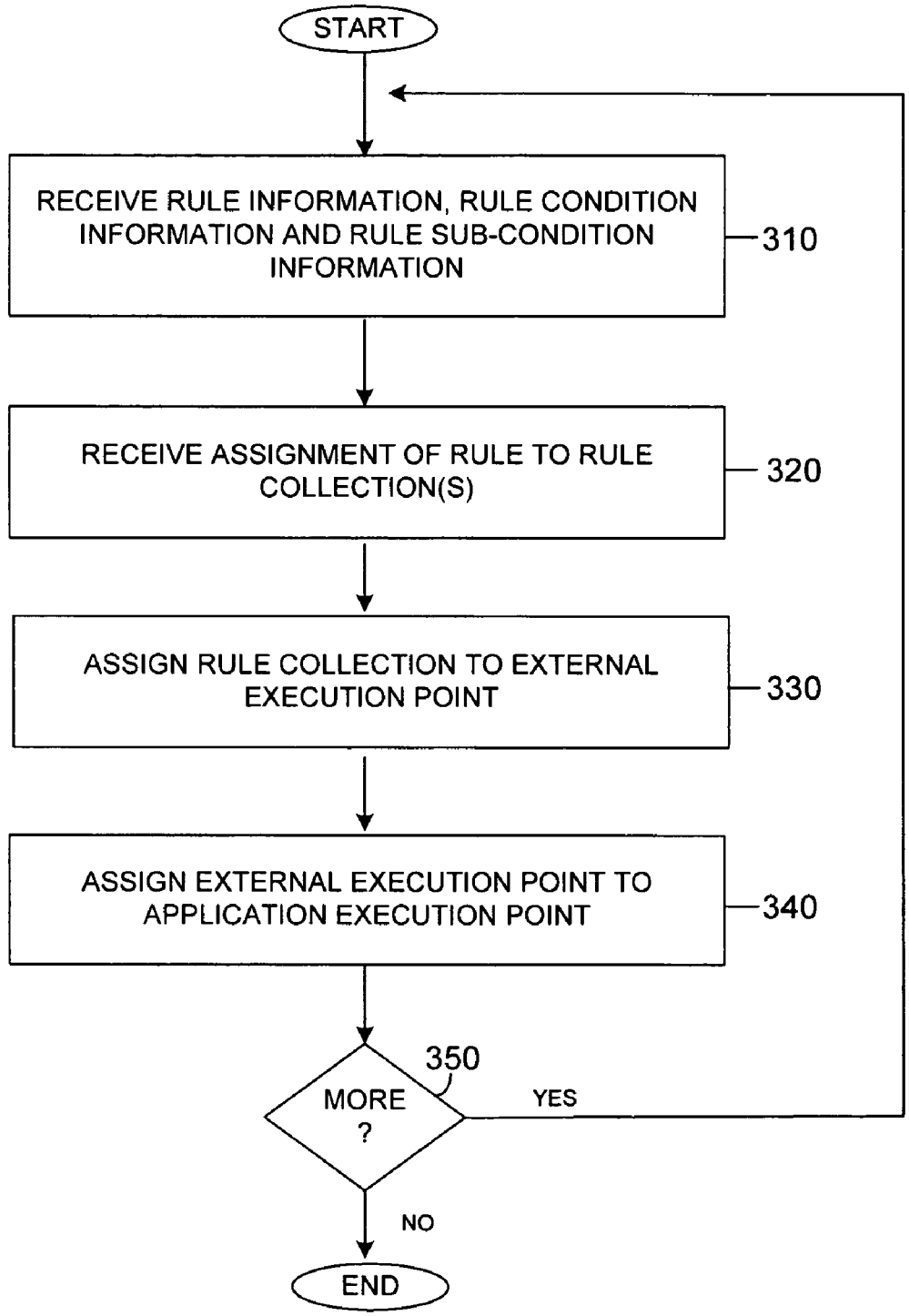
FIG. 3 is a flow chart of a process for defining a business process rule.

Referring to FIG. 3, the level of granularity provided in the data structures 200A and 200B of FIGS. 2A and 2B enables a flexible process to create and revise business process rules. One example is a process 300 of FIG. 3 for defining a collection of rules and a business process rule.

The process 300 may be performed by one or more processors in a system, such as, for example, the system 100 of FIG. 1. The processor is directed by a method, script, or other type of computer program that includes executable instructions for performing the process 300. Examples of such a collection of executable instructions include the define rule process 150 of FIG. 1. The process 300 may be manually initiated by a business analyst, a system administrator or another type of user who desires to define a business process rule for later execution at runtime.

To add a custom process to a computer application, a person accesses a user interface displayed on a computer system that enables a user to create or revise rule information (such as defining one or more of the attributes included in an entry of rule information 220), rule condition information (such as defining one or more attributes included for one or more entries of rule condition information 230), and rule sub-condition information (such as defining one or more of the attributes included in an entry of rule sub-condition information 240). The user-entered information is received by the processor and stored as rule information entries, rule condition entries, rule sub-condition entries and link information entries, all of which may be implementations of data structures 200A and 200B of FIGS. 2A and 2B.

For example, the processor may receive, from user input, an indication of an execution portion of the rule. This may be accomplished, for example, by a user keying a statement describing action to be taken when the condition identified in the condition portion is satisfied. In one example, a user may select an attribute from a displayed list of attributes that are associated with a type of business object used in the process to which the rule collection applies, and the user may key an attribute value or may select an attribute value from a displayed list of attribute values to be stored in the business object being processing when the rule is executed. More likely, however, the execution portion identifies a computer program or function (including a pre-defined function made accessible to the user) that includes executable instructions to be performed when the condition portion is met. Thus, the processor may receive a name of a computer program and a location where the computer program is stored. In one example, the processor may receive a relative or absolute uniform resource locator that identifies a computer program and its location.

In another example, the processor also may receive an indication of custom attributes to be associated with a rule. This may be, for example, an indication of transaction data (e.g., the business object that is being processed), an indication of master data (e.g., product information or customer information) that is related to the transaction data being processed, or an indication of customer-specific data. In one example, the user may select from a displayed list of various types of data that may be displayable.

In some implementations, a received rule condition or rule sub-condition portion may use a pre-defined function or other types of tools provided to the user to aid the user in identifying a condition to be satisfied in order for the action identified in the execution portion of a rule to be taken.

Similarly, the user accesses a user interface that enables a user to assign a rule to one or more rule collections, and, when necessary, create or revise rule collection information. The user-entered information is received by the processor and stored as rule collection information entries and link information entries, all of which may be implementations of data structures 200A and 200B of FIGS. 2A and 2B.

The user accesses a user interface that enables a user to assign a rule collection to an external execution point. The user-entered information is received by the processor and stored as a link information entry that associates the rule collection with an external execution point, which may be implementation of link information 265 of data structure 200B of FIG. 2B. The user also accesses a user interface that enables a user to assign an external execution point to an application execution point. The user-entered information is received by the processor and stored as a link information entry makes the association. For example, the processor may create an entry of link information 260 of data structure 200B of FIG. 2B. The user is able to continue creating and revising rule collection information, rule information, rule condition information, and rule sub-condition information as well as identifying associations of such information, associations of rule collections to external execution points, and associations of external execution points with application execution points until the user has completed defining the custom process.

Figure 4:
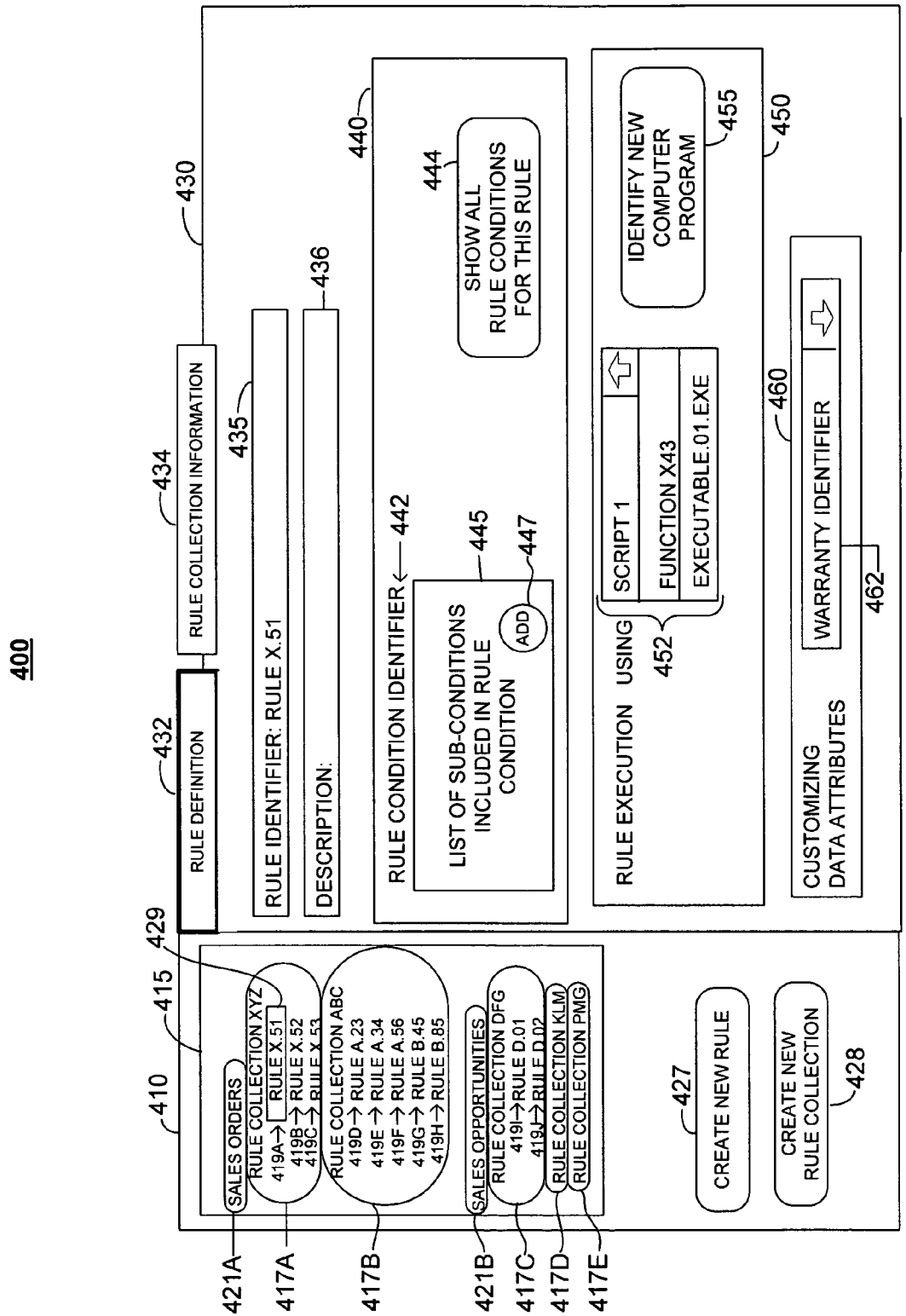
FIGS. 4 and 5 are block diagrams of example user interfaces for defining and viewing business process rule information.
Figure 5:
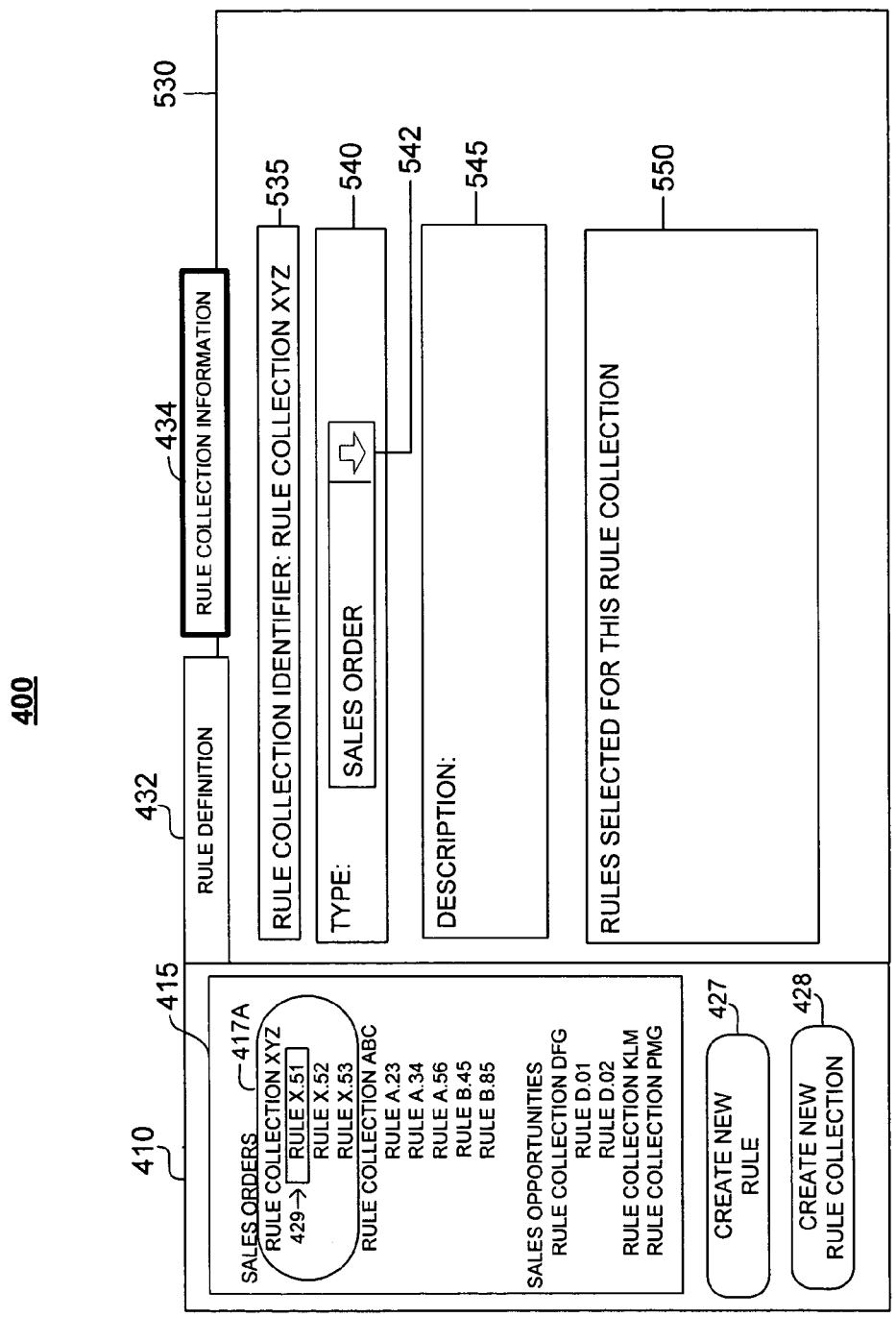

FIGS. 4 and 5 illustrate an example of a user interface 400 that may be displayed to a user who is defining a rule and rule collection information. The user interface 400 includes a rule collection window 410 that displays a list 415 of rule collections 417A-417E that previously have been defined using the user interface 400. Rule identifiers that are associated with some of the rule collections (i.e., 417A-417C) in the list 415 are visible in the rule collection window 410, but rule identifiers associated with other of the rule collections (i.e., 417D and 417E) in the list 415 are not visible in the rule collection window 410. In particular, rules identifiers 419A-419C included in the rule collection 417A, rule identifiers 419D-419H included in the rule collection 417B, and rule identifiers 419I-419J included in the rule collection 417C are visible in the list 415. In contrast, rule identifiers are not displayed for rule collections 417D and 417E. The user is able to use the user interface 400 to control whether the rules for a particular rule collection are visible. For example, a user may toggle the display of rules—that is, hide rules that are displayed in the list 415 or show rules that are not displayed in the list 415—by using a pointing device to click-on the displayed identifier for a particular rule collection. Thus, the user may hide rules identifiers 419A-419C by activating the rule collection identifier 417A, and the user may show rule identifiers for the rule collection identifier 417E by activating the rule collection identifier 417E.

The list 415 displayed in the rule collection window 410 includes an indication 421A or 421B of the type of business object that is associated with each displayed rule collection.

In particular, the list 415 displays the name of the type of business object as the indication 421A or 421B. Under each name of the business object type 421A or 421B, the rule collections that are applied to the business object type are displayed. In particular, rule collections 417A and 417B are applied to a sales order, as shown by the indication 421A. Similarly, rule collections 417C-417E are applied to a sales opportunity, as shown by the indication 421B. The user is able to use the user interface 400 to control whether the rule collections for a particular business object type are visible. For example, a user may toggle the display of rule collections—that is, hide rule collections that are displayed in the list 415 or show rule collections that are not displayed in the list 415—by using a pointing device to activate the indication 421A or 421B of a business object.

The display of the rules in context with an associated rule collection and business object type may be useful. For example, a user is able to view all of the rule collections that are associated with a particular business object type.

The rule collection window 410 also includes a control 427 for initiating a process to create a new rule and a control 428 for initiating a process to create a new rule collection, as described more fully below. In the illustration of the user interface 400, rule 419A is selected, as illustrated by box 429 used to highlight the selected rule 419A in the rule collection window 410.

The user interface 400 also includes a rule definition window 430 that displays information related to the particular rule highlighted in the rule collection window 410. The user indicates that the rule definition window 430 is to be displayed by activating the rule definition tab control 432, which may be accomplished by clicking-on the rule definition tab control 432 with a pointing device. In contrast, when a user selects the rule collection information tab control 434, a rule collection information window 530 is displayed, as illustrated in FIG. 5 and described more fully below.

The rule definition window 430 includes a rule identifier 435 or another type of title or name for the selected rule 419A The rule definition window 430 also includes rule condition information 440 and rule execution information 450 for the selected rule 419A.

More particularly, rule condition information 440 displays the rule condition identifier 442 of a rule condition that is associated with the selected rule 419A or enables a user to show all rule conditions that are associated with the selected rule 419A by activating control 444. When activated, control 444 causes a rule condition list to be displayed.

The rule condition information 440 also includes a list 445 of the rule sub-conditions that are included in the rule condition identified by rule condition identifier 442. A user may identify sub-conditions to be associated with the rule condition by activating the add control 447. The add control 447 is operable to display a list of previously defined sub-conditions from which the user may select.

In some implementations, the rule condition information 440 also may permit a user to identify whether all, or only one, of the components of the rule condition—that is, rule sub-conditions—need to be satisfied for the actions identified in the rule execution portion 450 are performed when the rule is executed.

The rule condition information 440 also includes a control 449 for defining a new rule condition component. For example, a pop-up window may be displayed from which the user identifies the type of rule condition component to be added to the rule condition information 440. Examples of types of rule condition components include a predefined rule, text, and a predefined function (or other type of computer program).

The rule execution information displays a rule execution portion previously defined for the selected rule 419A or enables a user to identify a rule execution portion for the selected rule 419A. As shown, the user may select one of a list 452 of predefined functions 452A-452C or define a new computer program by selecting control 455. The control 455 enables a user to identify a function, script, computer program, or other type of instruction collection. The listed functions may be, for example, a list of predefined functions 152 of FIG. 1. The indicated computer program, for example, may be an executable computer program that is compiled and ready to run, an interpreted computer program that requires additional translation of the instructions of the program to be executed, or a script that can be directly executed by a computer program that understands the scripting language in which the script is written.

The rule definition window 430 also includes a customizing data attributes window 460 that enables a user to select a type of custom attributes from a drop-down list 462. In some implementations, the user is permitted to select one or more custom-defined attributes, such as customized data 134 in FIG. 1.

A user may use the user interface 400 to define or revise a rule. For example, in response to a user activating the create new rule control 427, a rule definition window 430 is displayed for which no rule information is displayed. The user may enter a rule identifier 435 and an optional description 436 for the rule. In some implementations, the rule identifier 435 need not necessarily be assigned by a user and, instead, may be assigned by a process executed by the processor displaying the user interface 400. The rule identifier 435 is used to identify the particular rule in the list of rule collections shown in the rule collection window 410.

The user identifies the rule condition portions and rule execution portions using the rule condition window 440 and the rule execution window 450, respectively. The user also identifies displayable data to be associated with the rule using the displayable data window 460.

Referring now to FIG. 5, the display of the rule collection information window 530 is controlled through the selection by a user of the rule collection information tab control 434. The rule collection information window 530 that displays information related to the particular rule collection that is associated with which the rule 419A highlighted in the rule collection window 410.

The rule collection information window 530 includes a rule collection identifier 535 or another type of title or name for the rule collection 417A that is associated with the rule collection associated with the selected rule 419A. The rule information collection window 530 also displays, or enables a user to select, a type 540. Here, the type 540 enables a user to select one of multiple types of business objects presented when a drop down control 542 is selected. A description of the rule collection is presented in description window 545, and a list of the rules that are associated with the rule collection is presented in rule list window 550.

Figure 6:
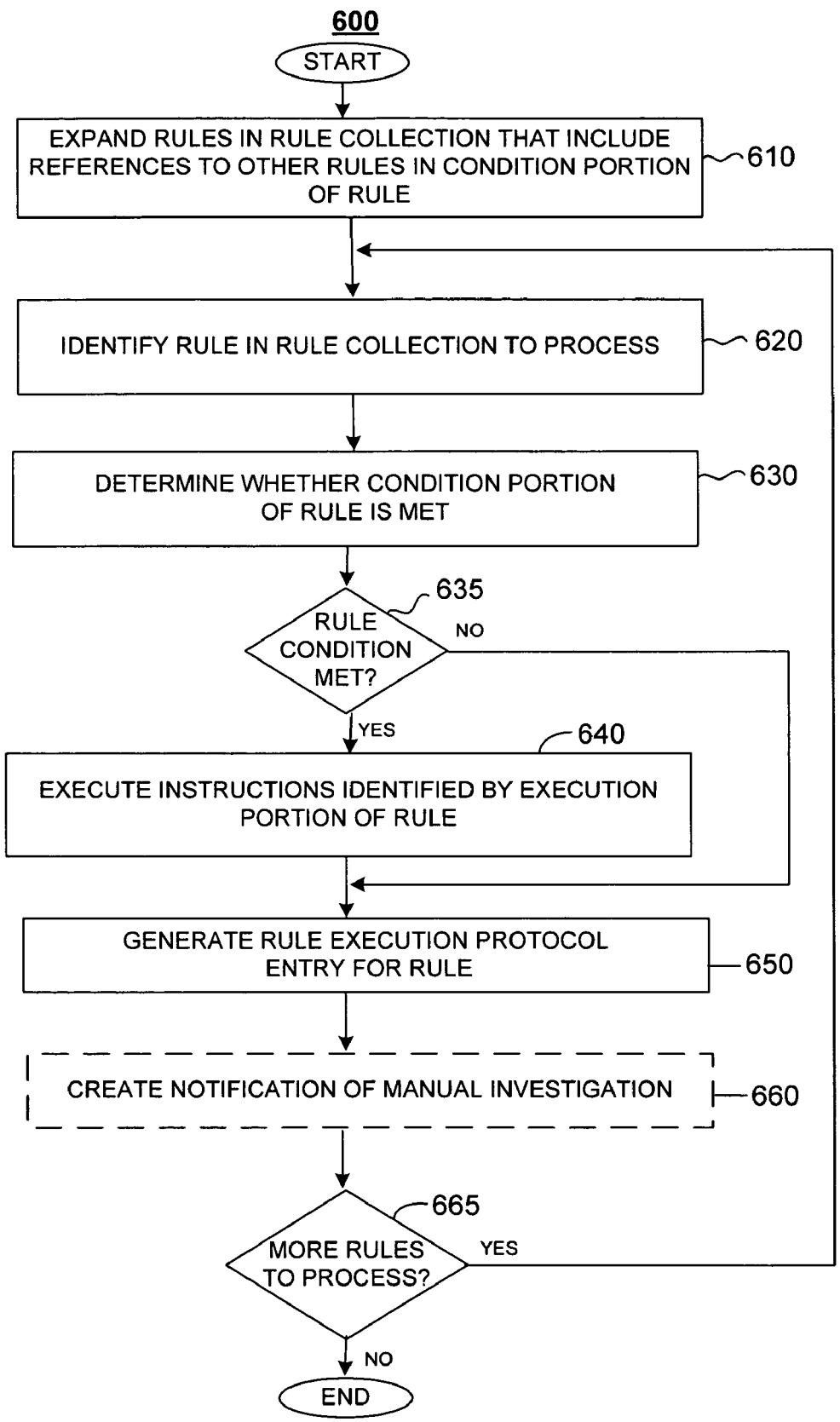
FIG. 6 is a flow chart of a process for executing a business process rule defined by a user.

FIG. 6 illustrates a process 600 for executing a business process rule defined by a user. The process 600 may be performed by one or more processors in a system, such as, for example, the system 100 of FIG. 1. The processor is directed by a method, script, or other type of computer program that includes executable instructions for performing the process 600. Examples of such a collection of executable instructions include the execute rules process 156 of FIG. 1. The process 600 may be initiated when the execution point associated with the rule collection is detected, such as by the process 138 to detect an execution point of FIG. 1. The process 600 is performed for the particular business object (such as a particular sales order or a particular return request) that is being processed. In some implementations, the process 600 also may be manually initiated by a business analyst, a system administrator or another type of user who desires to execute, for a particular business object, the rules associated with a particular rule collection.

The processor expands the rules in the rule collection that include references to other rules in the condition portion of the rule (step 610). This may be accomplished, for example, by replacing a reference to a rule in a condition portion with the condition portion of the references rule, and repeatedly doing so until all rule references have been replaced with the respective condition portion of the referenced rule. For example, each rule condition that relates to an execution portion of a rule may be expanded to include the rule sub-conditions that are referenced by the rule condition. The processor then identifies a particular rule in the rule collection to process (step 620). In some implementations, each rule may be associated with an order indicator, and, in such a case, the rules associated with the rule collection are processed based on the order indicator associated with each rule.

The processor then determines whether the condition portion of the rule is met (step 630), and, only when the condition is met, the processor executes the instructions identified by the execution portion of the rule (step 640). For example, a computer program that is identified in the execution portion of the rule is initiated. The computer program typically returns a status indicative of the results of the executed instructions. For example, when a return request is processed, an execution status for each rule is returned where the execution status indicates whether the return request is approved based on the rule. Examples of execution status for a rule executed for a return request include approved for an approved return, rejected for a rejected return, or manual investigation for a return request that has been identified as needing manual investigation to determine whether the return is approved or rejected.

The processor then generates a rule execution protocol entry that describes the rule and results of the rule processing (step 650). For example, using the data structure 200 of FIG. 2 to illustrate, the processor generates an identifier 252, stores the rule identifier of the rule being processed as the rule identifier 254, stores the business object identifier for the particular business object being processed in the business object identifier 256, stores an indication of whether the condition was met in indicator 258, and stores an indication of execution status in execution status 260 for the rule execution protocol entry. The processor also may access and store customer-specific data 262 associated with the business object in the rule execution protocol entry. The inclusion of customized or customer-defined data in the rule execution protocol may help a user to extend the rule protocol by adding customer data to the rule protocol. That is, to specify data to be stored in the rule protocol entry for an executed rule. Then, when the rule protocol entry is displayed the customer data values also are displayed and available to help the user determine why the rule failed to execute.

The processor may store an activation status 264 in the rule execution protocol entry indicating that the rule is to be executed for the business object. In this example, the rule execution protocol entry shows all rules (including rules for which the condition portion was not satisfied so that the execution portion was not executed). The rule execution protocol entry also shows status to indicate whether the execution portion was executed.

In some implementations, a rule execution protocol entry may be created only when the execution portion of the rule executes—that is, the condition portion is met—or may be created only when a particular execution status (e.g., manual investigation, failed, or rejected) is returned from the computer program executed in step 640.

The processor may create a notification of manual investigation (step 660). For example, when the computer program executed in step 640 returns an execution status that indicates that manual investigation is required, the processor may create an appropriate notification. In some implementations, any declined/rejected transaction may result in a notification of manual investigation. In some implementations, the notification may be in the form of a workflow item that is automatically routed to a person having an appropriate role (such as a business analyst for return processing role, a human resource analyst role, a financial analyst role, or a quality assurance role) for follow-up using computer-supported manual processing. To do so, the processor may create a workflow item, may identify a particular user to be assigned the workflow item to handle, and may send the workflow item to the identified user. In some implementations, a role (rather than a particular user) may be identified. Additionally or alternatively, an organizational model of users, organizations, and/or roles may be used to identify a user to whom the workflow item is to be assigned.

When there are more rules in the rule collection to process (step 665), the processor identifies another rule (step 620) and continues as previously described. The determination whether there are more rules to process may be based, for example, on whether all of the rules in the rule collection have been processed. The determination also may be based on whether a previously executed rule returned a particular execution status. For example, it may be useful for a rule execution process to stop processing rules for a business object when one of the rules has returned a particular value, such as when a rule indicates that the return request is to be rejected. When the determination is made that there are no more rules to process (step 665), the process 600 ends.

Figure 7:
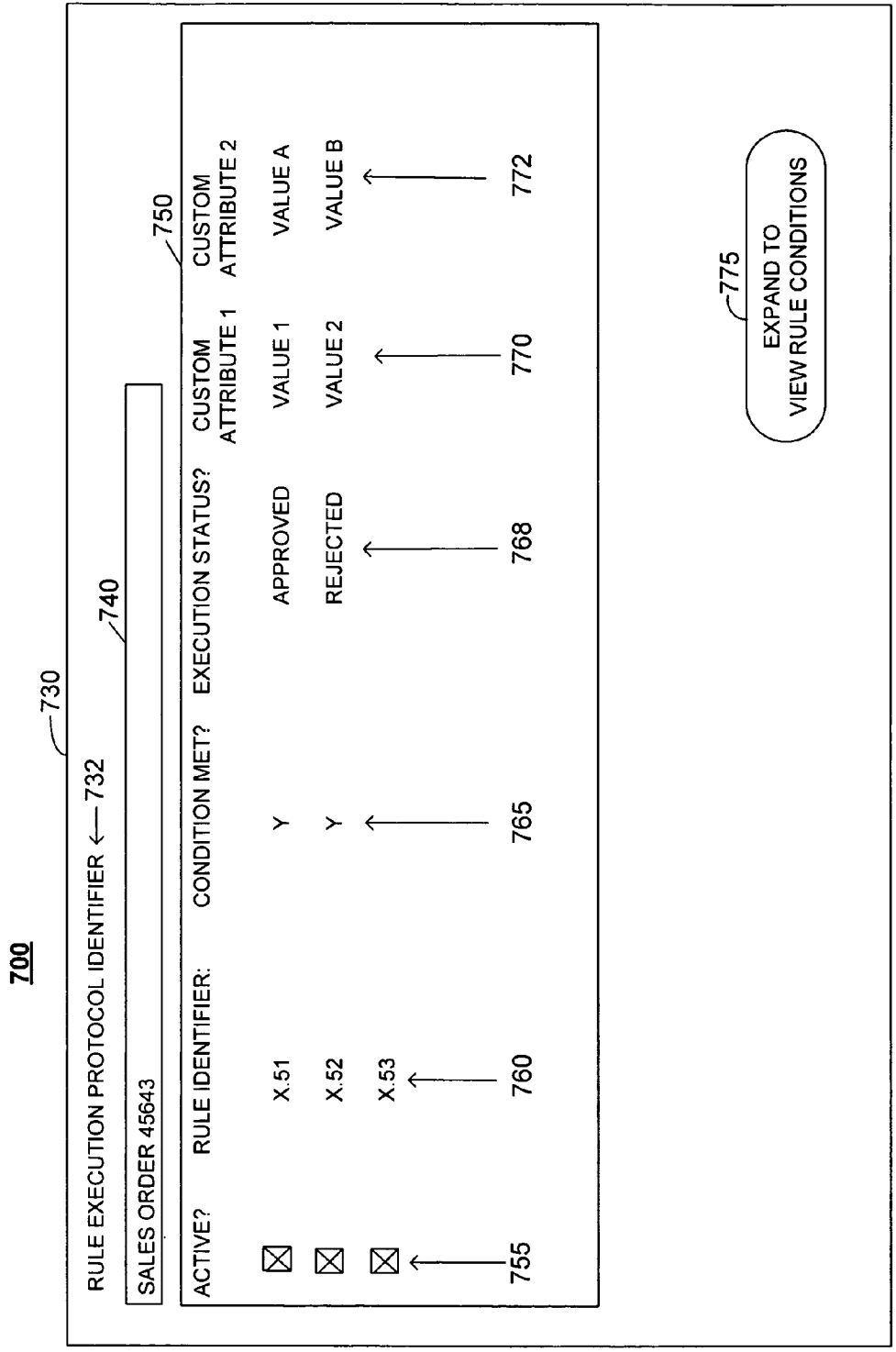
FIGS. 7 and 8 are block diagrams of example user interfaces for displaying information about execution of a business process rule.

FIG. 7 illustrate an example of a user interface 700 that is displayed to a user who reviewing the results of a rule executed with respect to a particular business object. For example, the user interface may display a rule execution protocol entry, such as rule execution protocol information 250 described in FIG. 2.

More particularly, the user interface 700 includes a rule execution protocol window 730 that presents rule execution protocol entries for rules processed for a particular business object. The rule execution protocol window 730 includes the rule execution protocol identifier 732 that uniquely identifies the entry and a business object identifier 740 that identifies the business object processed by the rules listed in the rule window 750. The rule window 750 lists, in tabular form, each of the rules executed for the particular business object 740. In general, the rule window 750 identifies the rule identifier 760, an indication 765 whether the rule conditions (and any sub-conditions) of the rule was satisfied and, when the condition was satisfied, an execution status 768 that resulted from the execution portion. Custom data values 770 and 772 are displayed when there is user-defined data associated with the rule, such as one or more custom attributes 227 in FIG. 2. The activation status 755 of the rule as to the particular business object identified 740 also is displayed. As shown, the activation status 755 is a checkbox that may be activated, or deactivated, by the user to control whether the rule is applied to the particular business object identified 740.

Figure 8:
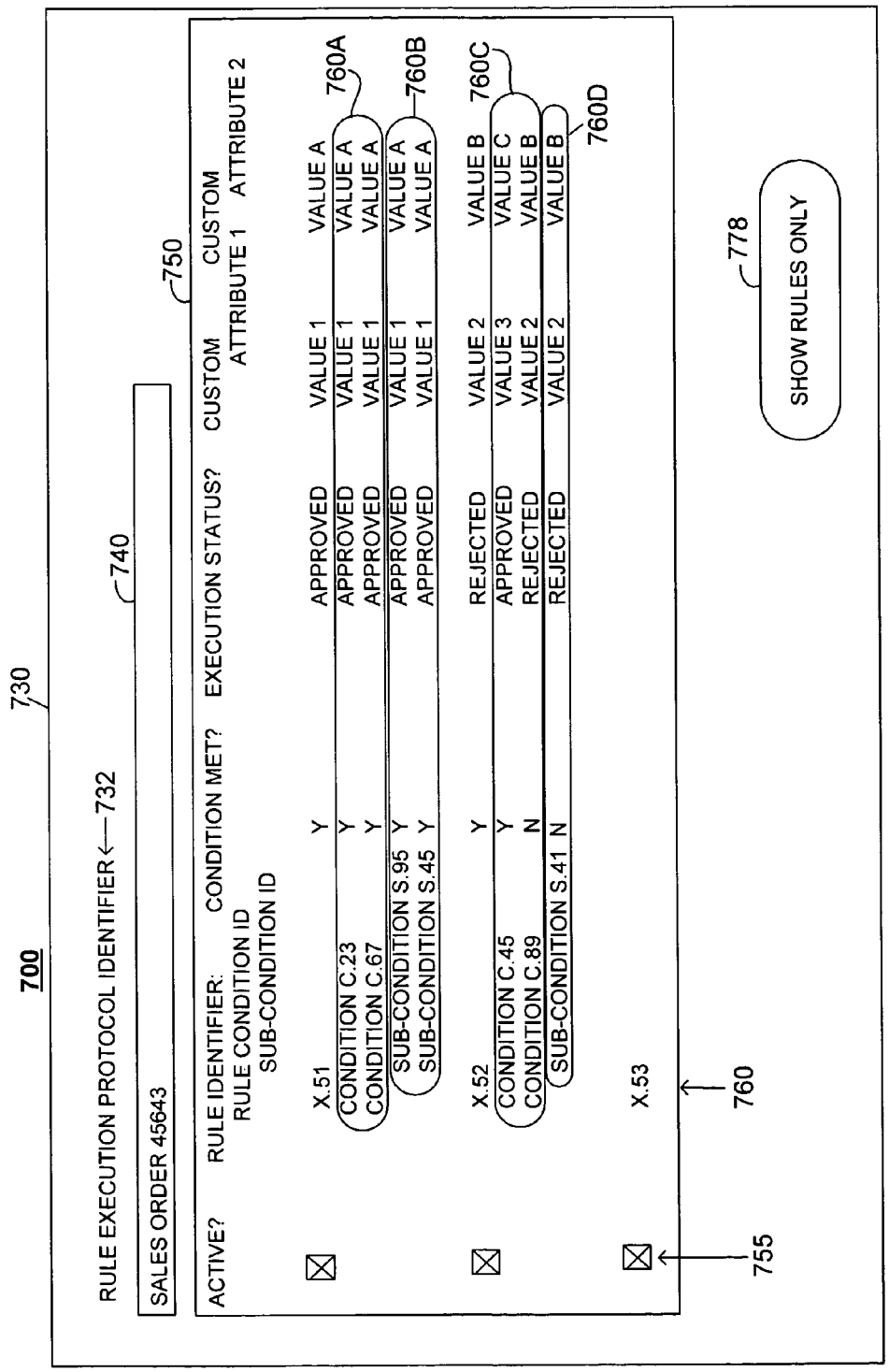

As shown in the example of user interface 700, the processor that executed the rules for the business object identified by business object identifier 740 stopped executing rules for the business object 740 after the rule X.52 returned an execution status of rejected. As such, there is not a rule execution protocol information other than the rule identifier for the subsequent rule (i.e., rule X.53) for display in the table window. The rule execution protocol window 730 also includes a control 775 to expand the information presented to include sub-conditions, as shown in FIG. 8. When expanded, the rule execution protocol window 730 in the user interface 800 in FIG. 8 also includes rows of protocol execution entries for conditions (as shown in rows 760A and 760C) and protocol execution entries for sub-conditions (as shown in rows 760B and 760D). The user interface 800 also includes a control 778 to show rules without displaying protocol entries for rule conditions and sub-conditions that were executed for the rules, as previously described with respect to FIG. 7.

A user may use the user interfaces 700 and 800 to view rule execution protocol entries to help the user investigate a problem with rule execution. The user interfaces 700 and 800 may help a user to investigate why a rule failed to execute or other types of unexpected results. The user interface 700 may be used to determine whether all rules executed and the results of each executed rule, which, in turn, may help the user to understand the unexpected results. For example, a user may view customized data that is relevant, determine whether the rule condition was satisfied, and determine the execution status for the rule when the rule has been executed. The user is able to selectively deactivate the rule as to the business object and re-run the rule for the business object. In some implementations, the user may control the level of information presented—such as by displaying only rules, rules and rule conditions, and/or rules, rule conditions and rule sub-conditions.

Figure 9:
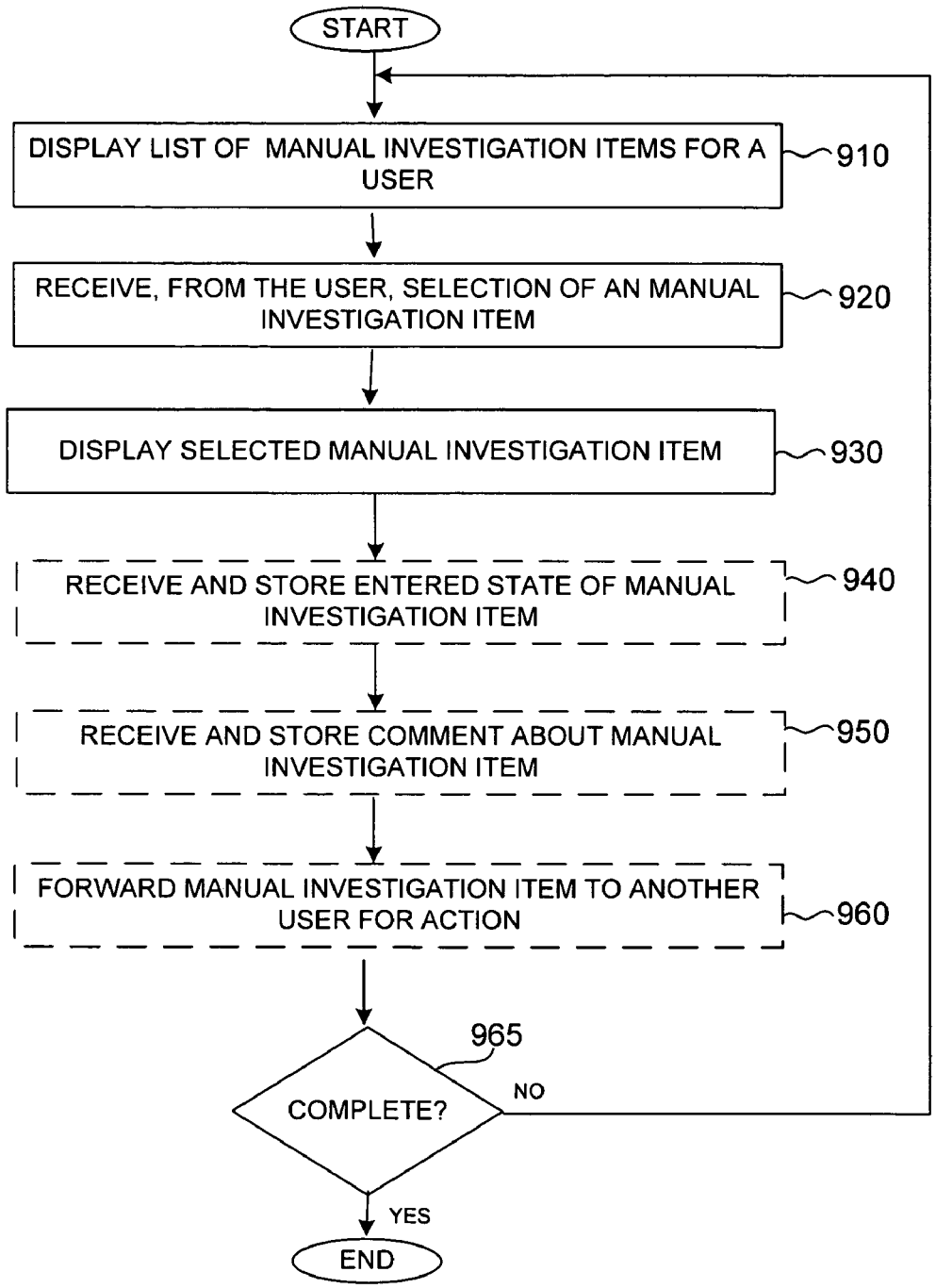
FIG. 9 is a flow chart of a process for manual investigation of the results of execution of a business process rule.

FIG. 9 illustrates a process 900 for manual investigation of the results of execution of a business process rule. The process 900 may be performed by one or more processors in a system, such as, for example, the system 100 of FIG. 1. The processor is directed by a method, script, or other type of computer program that includes executable instructions for performing the process 900. Examples of such a collection of executable instructions include the process 159 of FIG. 1. The process 900 may be initiated when a business analyst or other type of user manually initiates the process 900.

The processor displays a list of manual investigation items for a user, typically the user who initiated the process 900 (step 910) and receives, from the user, a selection of a manual investigation item (step 920). The processor displays the manual investigation item (step 930).

The user may take one or more appropriate actions with regard to the manual investigation item. For example, the user may identify a status or state to be associated with the manual investigation item, in which case the processor receives and stores the identified state of the manual investigation item entered by the user (step 940). For example, after performing the manual investigation, the user may determine that the item requested by a customer to be returned may be returned or may not be returned. The state identified relates to the return request—that is, the processing of the business object and does not relate to the status of a particular rule.

The user also may enter a comment, in which case the processor receives and stores the comment entered by the user (step 950). The comment may be displayed for other users who subsequently view the manual investigation item.

The user also may indicate that the manual investigation item is to be forwarded to another user, in which case the processor forwards the manual investigation item to the indicated user (step 960).

When the user indicates that manual investigation is complete (step 965), the process 900 ends. Otherwise, the processor displays the list of manual investigation items from which the user may select (steps 910 and 920), and continues as described previously.

Figure 10:
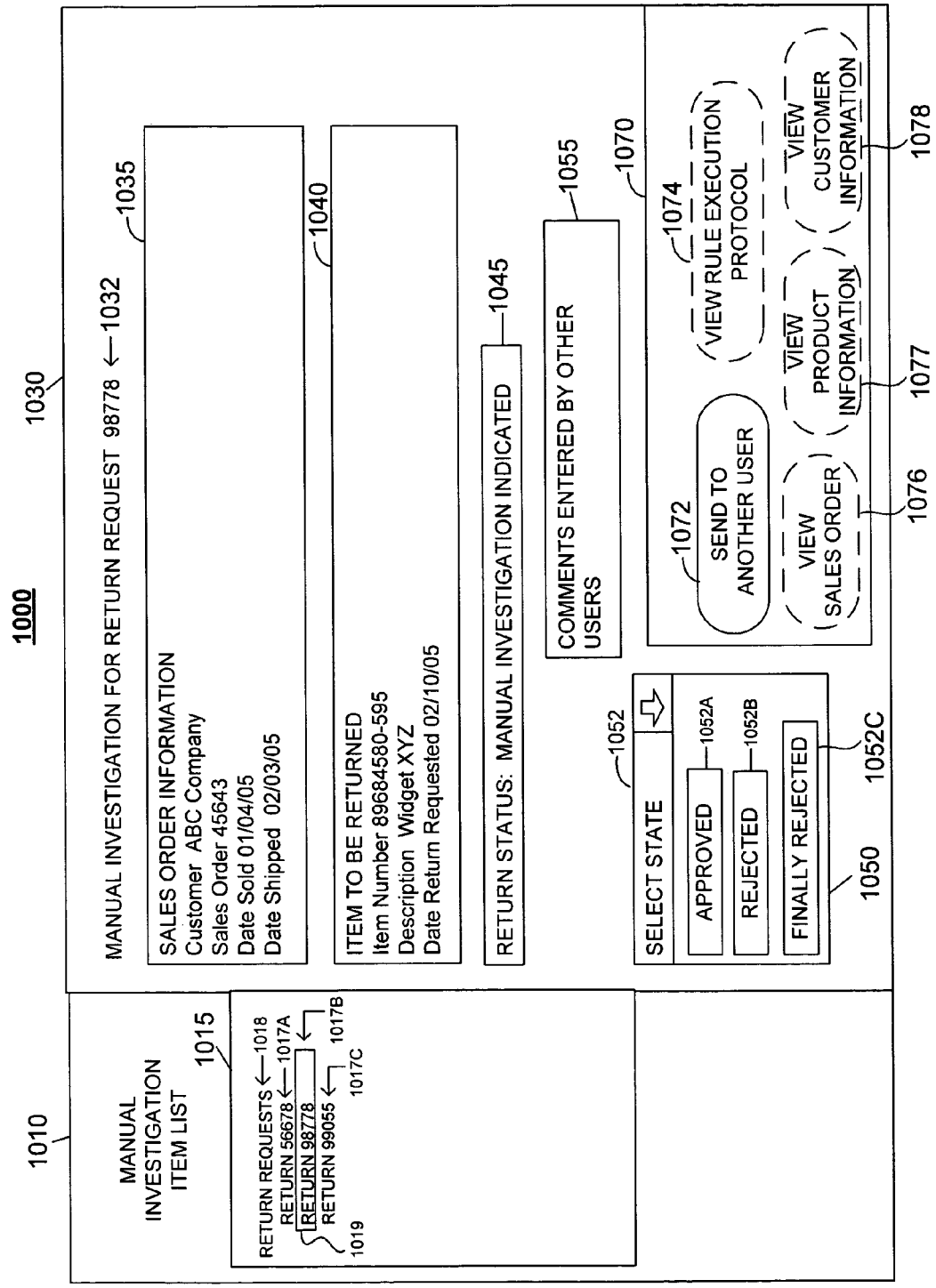
FIG. 10 is a block diagram of an example user interface for manual investigating the results of execution of a business process rule.

FIG. 10 depicts an example of a user interface 1000 that is displayed to a user who is investigating unexpected results of executing a rule with respect to a business object. More particularly, the user interface 1000 may be displayed to a user who is investigating why a return request was not approved by a return request process defined by user-defined rules.

The user interface 1000 includes a window 1010 that displays a list 1015 of manual investigation items that have been identified. The list 1015 organizes the manual investigation items (here, return requests 1017A-1017C) based on a category 1018 of investigation items.

In the illustration of the user interface 1000, return request 1017B is selected, as illustrated by the box 1019 used to highlight the selected return request 1017B.

The user interface 1000 also includes a manual investigation window 1030 that displays information related to the particular manual investigation item highlighted in the list 1015 of manual investigation items. The manual investigation window 1030 includes an identifier 1032 for the selected item 1017B. The manual investigation window 1030 also includes business object information 1035 related to the sales order from which an item is to be returned, and return information 1040 that information related to the return request.

The manual investigation window 1030 includes an indication 1045 as to the return status of the return request. Examples of return status include manual investigation indicated, return approved, returned disapproved or rejected, and return finally rejected. The status of return finally rejected indicates that a subsequent return request is not permitted to be made by the customer.

The manual investigation window 1030 also includes a select-state window 1050 that enables a user to display, by activating control 1052, selectable options of return status. As shown, an approved status 1052A, a rejected status 1052B, and a finally rejected status 1052C are presented for selection by the user.

The manual investigation window 1030 includes a comments window 1055 that presents any comments entered in associated with the investigation item. The comments displayed in the comments window 1055 may include, for example, comments entered using process 900 in FIG. 9.

The manual investigation window 1030 includes controls 1070. A control 1072 is operable to enable a user to identify a user to whom the item should be sent for further investigation. Optional controls 1074-1078 enable the user to display information related to the item or information that may be helpful in determining whether the return request may be accepted. The controls include controls for displaying rule execution protocol information (by using control 1074), sales order information (by using control 1076), product information (by using control 1077) and customer information (by using control 1078).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the invention have been described. Nevertheless, it will be understood that various modifications may be made without departing from the spirit and scope of the invention. Accordingly, other implementations are within the scope of the following claims.

What is claimed is:

1. A computer program product tangibly embodied in a machine-readable medium for customizing a computer-executed business process for a particular business enterprise, the computer program product comprising:
    a generic component that includes generic data attributes and instructions that, when executed, cause generic transaction data to be processed in a manner that is applicable to many different business enterprises;
    a rule handling component that includes data structures and instructions that, when executed, display a user interface that enables a person to define information stored in the data structures to control a manner of processing transaction data that is applicable to a particular business enterprise, the information defining a custom business process for the particular enterprise, wherein:
        the data structures comprising:
            a rule collection data structure storing rule collection data;
            a rule data structure storing rule data representing a rule for processing transaction data wherein:
                a rule entry in the rule data structure includes an execution portion that identifies processing of transaction data to be performed when a rule condition associated with the rule entry is met; and
                at least one entry in the rule data structure relates to at least one entry in the rule collection data structure; and
            a rule condition data structure storing rule condition data wherein:
                a rule condition entry in the rule condition data structure includes a condition portion that defines conditions for which the execution portion of a related rule entry is to be executed; and
                at least one entry in the rule condition data structure relates to at least one entry in the rule data structure; and
            a rule protocol data structure storing rule protocol data wherein:
                a protocol entry in the rule protocol data structure includes a rule identifier to identify an entry in the rule data structure, a data object identifier to identify a particular data object, an indication whether a condition portion associated with the entry in the rule data structure was met, and an execution status indicating results when the condition portion was met; and
        the instructions that, when executed, cause the rule handling component to perform steps comprising:
            determining whether a condition portion of a rule condition entry in the rule condition data structure is met,
            in response to a determination that the condition portion is met, performing an execution portion of a rule entry in the rule data structure that is related to the rule condition entry, and
            generating and storing a protocol entry in the rule protocol data structure that corresponds to the rule condition entry.

2. The computer program product of claim 1 further comprising a custom component that includes custom attributes that are not included in the generic data attributes, wherein a protocol entry in the rule protocol data structure includes one or more custom attributes.

3. The computer program product of claim 1 further comprising instructions that, when executed, cause the rule handling component to display one or more protocol entries in the rule protocol data structure that relate to a particular data object.

4. The computer program product of claim 1 further comprising a collection link data structure storing collection link data wherein a collection link entry in the collection link data structure includes an association between a rule entry in the rule data structure and a rule collection entry in the rule collection data structure.

5. The computer program product of claim 1 further comprising a rule link data structure storing rule link data wherein a rule link entry in the rule link data structure includes an association between a rule entry in the rule data structure and a rule condition entry in the rule condition data structure.

6. The computer program product of claim 1 further comprising:
    a rule sub-condition data structure storing rule sub-condition data wherein:
        a rule sub-condition entry in the rule sub-condition data structure includes a sub-condition portion that defines a sub-condition that is associable with a rule condition for which the execution portion of a related rule entry is to be executed; and at least one entry in the rule sub-condition data structure relates to at least one entry in the rule condition data structure; and at least one entry in the rule sub-condition structure includes a sub-condition portion that references one or more of the custom attributes; and the protocol entry in the rule protocol data structure includes an indication whether a sub-condition portion associated with the entry in the rule sub-condition data structure was met, and an execution status indicating results when the sub-condition portion was met.

7. The computer program product of claim 1 further comprising a second generic component that includes instructions that, when executed, cause transaction data applicable to the second generic component to be processed in a manner that is applicable to many different business enterprises.

8. A computer system for defining a custom computer-executed business process for a particular business enterprise, the computer system comprising:

a rule repository including data structures, the data structures comprising:

a rule collection data structure storing rule collection data;

a rule data structure storing rule data representing a rule for processing transaction data wherein:

a rule entry in the rule data structure includes an execution portion that identifies processing of transaction data to be performed when a rule condition associated with the rule entry is met; and at least one entry in the rule data structure relates to at least one entry in the rule collection data structure; and a rule condition data structure storing rule condition data wherein:

a rule condition entry in the rule condition data structure includes a condition portion that defines conditions for which the execution portion of a related rule entry is to be executed; and at least one entry in the rule condition data structure relates to at least one entry in the rule data structure; and a rule protocol data structure storing rule protocol data wherein:

protocol entry in the rule protocol data structure includes a rule identifier to identify an entry in the rule data structure, a data object identifier to identify a particular data object, an indication whether a condition portion associated with the entry in the rule data structure was met, and an execution status indicating results when the condition portion was met; and executable software comprising:

a generic component that includes generic data attributes and instructions that, when executed, cause generic transaction data to be processed in a manner that is applicable to many different business enterprises;

a rule handling component that includes data structures and instructions that, when executed, cause transaction data to be processed in a manner that is applicable to a particular business enterprise by causing the rule handling component to display a user interface that enables a person to define information stored in the data structures to control the manner of processing transaction data that is applicable to the particular business enterprise, the information defining a custom business process for the particular enterprise and to perform steps comprising:

determining whether a condition portion of a rule condition entry in the rule condition data structure is met, in response to a determination that the condition portion is met, performing an execution portion of a rule entry in the rule data structure that is related to the rule condition entry, and generating and storing a protocol entry in the rule protocol data structure that corresponds to the rule condition entry.

9. The system of claim 8 further comprising executable software comprising a custom component that includes custom attributes that are not included in the generic data attributes, wherein a protocol entry in the rule protocol data structure includes one or more custom attributes.

10. The system of claim 8 further comprising instructions that, when executed, cause the rule handling component to display one or more protocol entries in the rule protocol data structure that relate to a particular data object.

11. The system of claim 8 further comprising a collection link data structure storing collection link data wherein a collection link entry in the collection link data structure includes an association between a rule entry in the rule data structure and a rule collection entry in the rule collection data structure.

12. The system of claim 11 further comprising a rule link data structure storing rule link data wherein a rule link entry in the rule link data structure includes an association between a rule entry in the rule data structure and a rule condition entry in the rule condition data structure.

13. The system of claim 8 further comprising:

a rule sub-condition data structure storing rule sub-condition data wherein:

a rule sub-condition entry in the rule sub-condition data structure includes a sub-condition portion that defines a sub-condition that is associable with a rule condition for which the execution portion of a related rule entry is to be executed; and at least one entry in the rule sub-condition data structure relates to at least one entry in the rule condition data structure;

at least one entry in the rule sub-condition structure includes a sub-condition portion that references one or more of the custom attributes; and the protocol entry in the rule protocol data structure includes an indication whether a sub-condition portion associated with the entry in the rule sub-condition data structure was met, and an execution status indicating results when the sub-condition portion was met.

14. The system of claim 13 further comprising a rule condition link data structure storing rule condition link data wherein a rule condition link entry in the rule condition link data structure includes an association between a rule condition entry in the rule condition data structure and a rule sub-condition entry in the rule sub-condition data structure.

15. The system of claim 8 further comprising executable software including a second generic component that includes instructions that, when executed, cause transaction data applicable to the second generic component to be processed in a manner that is applicable to many different business enterprises.

* * * * *